US012711700B2

(12) United States Patent
Biswas et al.

(10) Patent No.: US 12,711,700 B2
(45) Date of Patent: Aug. 18, 2026

(54) OBJECT COVERAGE BASED METHOD FOR CAPTURING AN EFFECTIVE SET OF IMAGES FOR 3-D MODELING WITH MOTION FEEDBACK

(71) Applicant: Adobe Inc., San Jose, CA (US)

(72) Inventors: Mainak Biswas, Uttar Pradesh (IN); Nishtha Behal, Uttar Pradesh (IN); Anubhav Jain, Haryana (IN)

(73) Assignee: Adobe Inc., San Jose, CA (US)

( * ) Notice: Subject to any disclaimer, the term of this patent is extended or adjusted under 35 U.S.C. 154(b) by 329 days.

(21) Appl. No.: 18/242,648

(22) Filed: Sep. 6, 2023

(65) Prior Publication Data

US 2025/0078401 A1 Mar. 6, 2025

(51) Int. Cl.

| | |
|---|---|
| ***G06T 17/00*** | (2006.01) |
| ***G06T 3/4053*** | (2024.01) |
| ***G06T 7/20*** | (2017.01) |
| ***G06T 7/70*** | (2017.01) |
| ***G06V 10/24*** | (2022.01) |

(52) U.S. Cl.

CPC ............ *G06T 17/00* (2013.01); *G06T 3/4053* (2013.01); *G06T 7/20* (2013.01); *G06T 7/70* (2017.01); *G06V 10/242* (2022.01)

(58) Field of Classification Search

CPC ......... G06T 17/00; G06T 7/70; G06T 3/4053; G06T 7/20; G06V 10/242

See application file for complete search history.

(56) References Cited

U.S. PATENT DOCUMENTS

| | | | | |
|---|---|---|---|---|
| 6,914,599 | B1 * | 7/2005 | Rowe | G06T 7/97 382/154 |
| 2017/0046868 | A1 * | 2/2017 | Chernov | G06T 7/246 |
| 2020/0226736 | A1 * | 7/2020 | Kar | G06T 15/08 |
| 2023/0334768 | A1 * | 10/2023 | Holzer | G06F 3/04815 |

(Continued)

OTHER PUBLICATIONS

Rachmielowski, Adam, "Realtime Visualization of Monocular Data for 3D Reconstruction," 2008 Canadian Conference on Computer and Robot Vision, Windsor, Canada, 2008, pp. 196-202 (Year: 2008).*

(Continued)

*Primary Examiner* — Terrell M Robinson

(74) *Attorney, Agent, or Firm* — Kilpatrick Townsend & Stockton LLP

(57) ABSTRACT

A system accesses, during a camera scan of a 3D physical object, video feed data of a user computing device including a plurality of frames. The system generates camera scan data including a set of 2D images of the physical object generated from a subset of the plurality of frames. Generating the camera scan data can include, responsive to determining that a translation between a previous frame and a current frame is greater than a threshold, including the current frame in the camera scan data. Generating the camera scan data can include excluding the current frame from the camera scan data responsive to determining an undesired camera movement type associated with the current frame. Generating the camera scan data can include indicating, in a surface coverage preview model, points of the 3D physical object included in at least a predefined number of consecutive frames of the subset of frames.

20 Claims, 11 Drawing Sheets

(56) References Cited

U.S. PATENT DOCUMENTS

2024/0029761 A1* 1/2024 Ocean .................... G11B 27/10
2025/0093281 A1* 3/2025 Holzer ................ G06F 3/04815

OTHER PUBLICATIONS

Muratov, Oleg, “3DCapture: 3D Reconstruction for a Smartphone”, Proceedings of the IEEE Conference on Computer Vision and Pattern Recognition (CVPR) Workshops, 2016, pp. 75-82 (Year: 2016).*
Lechlek, Loubna, “Interactive HDR image-based rendering from unstructured LDR photographs”, Computers & Graphics, vol. 84, 2019, pp. 1-12, (Year: 2019).*
Adobe, “Capture Your World in 3D”, Available at https://www.adobe.com/in/products/substance3d-sampler.html, 2023, 13 pages.
Polycam, “3D Capture, For Everyone”, Available at https://poly.cam/, 2023, 10 pages.
Scaniverse, “Capture Life in 3D”, Available at https://scaniverse.com/, 2023, 7 pages.
Luma Ai, “Capture in Lifelike 3D”, Available at https://lumalabs.ai/, 2023, 6 pages.
Eyecue Vision Technologies Ltd., “Qlone”, Available at https://www.qlone.pro/, 2017-2023, 3 pages.
Epic Games, Inc. Unreal Engine, “RealityScan”, Available at https://www.unrealengine.com/en-US/realityscan, 2004-2023, 9 pages.
Stephens, Jonathan, Linkedin Post, “Jonathan Stephens’ Post”, How to Capture Images for 3D Reconstruction, 2023, 15 pages.

* cited by examiner

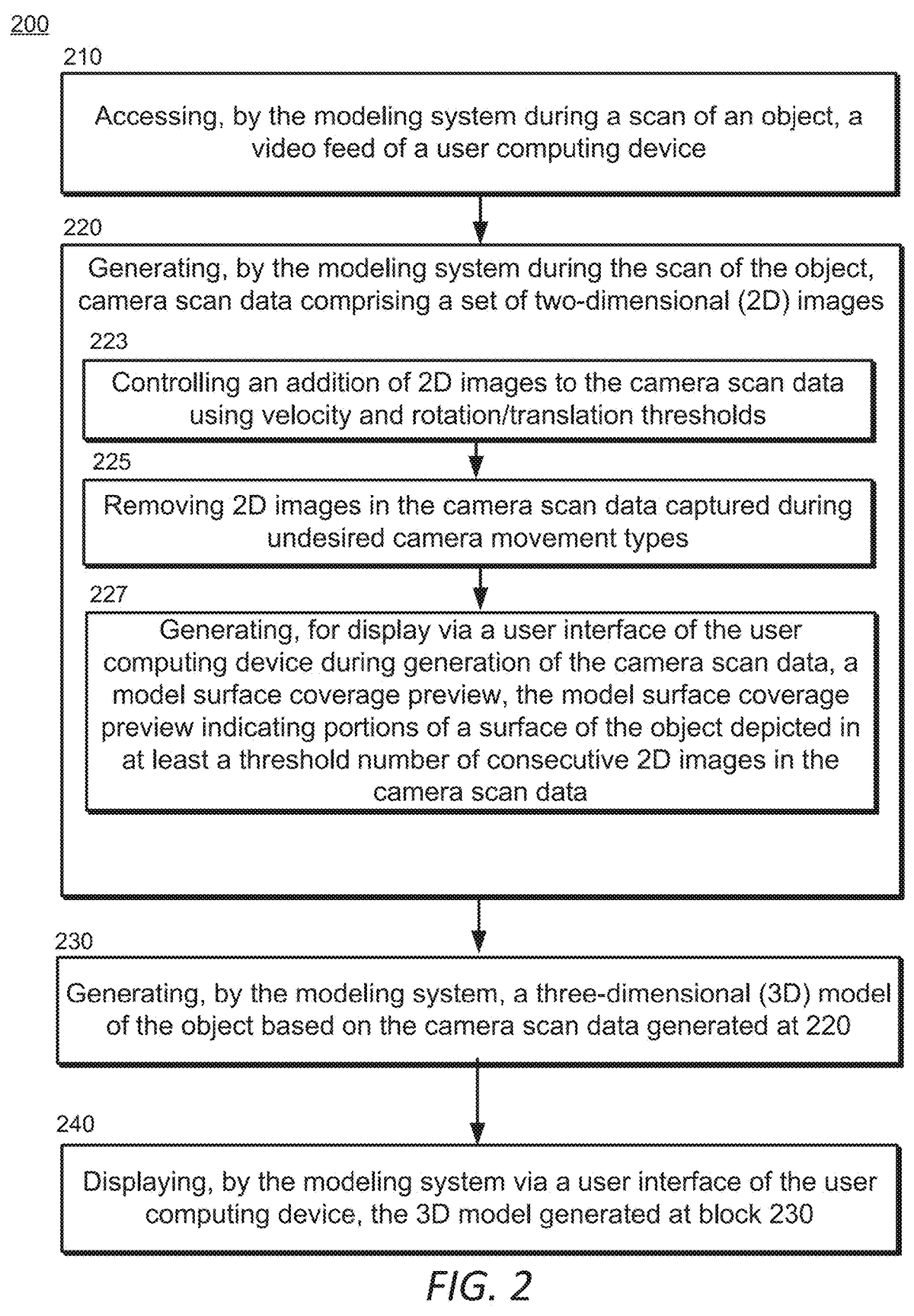

200

210 Accessing, by the modeling system during a scan of an object, a video feed of a user computing device 220 Generating, by the modeling system during the scan of the object, camera scan data comprising a set of two-dimensional (2D) images 223 Controlling an addition of 2D images to the camera scan data using velocity and rotation/translation thresholds 225 Removing 2D images in the camera scan data captured during undesired camera movement types 227 Generating, for display via a user interface of the user computing device during generation of the camera scan data, a model surface coverage preview, the model surface coverage preview indicating portions of a surface of the object depicted in at least a threshold number of consecutive 2D images in the camera scan data 230 Generating, by the modeling system, a three-dimensional (3D) model of the object based on the camera scan data generated at 220

240 Displaying, by the modeling system via a user interface of the user computing device, the 3D model generated at block 230

FIG. 2

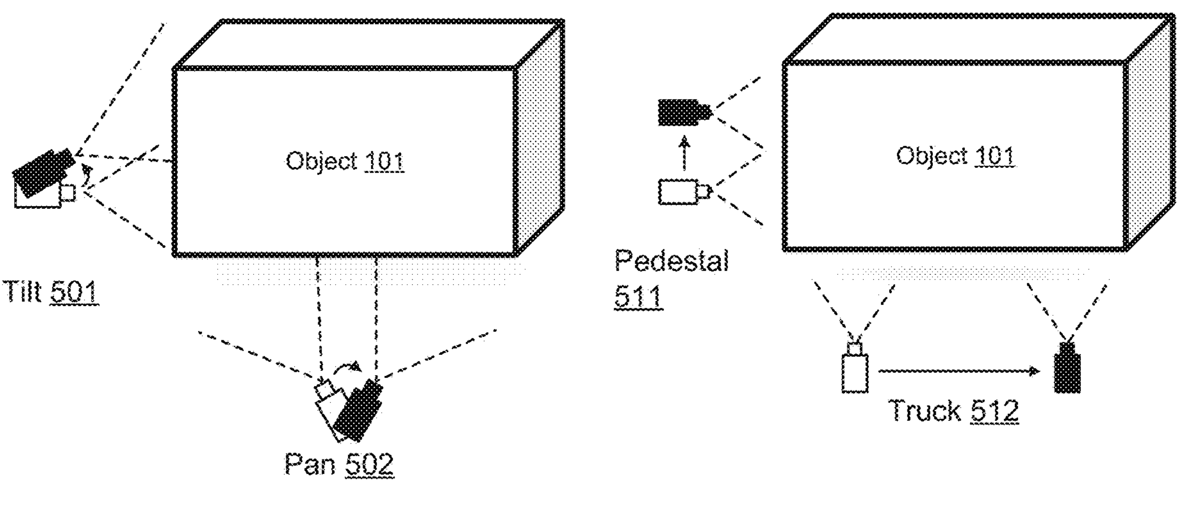
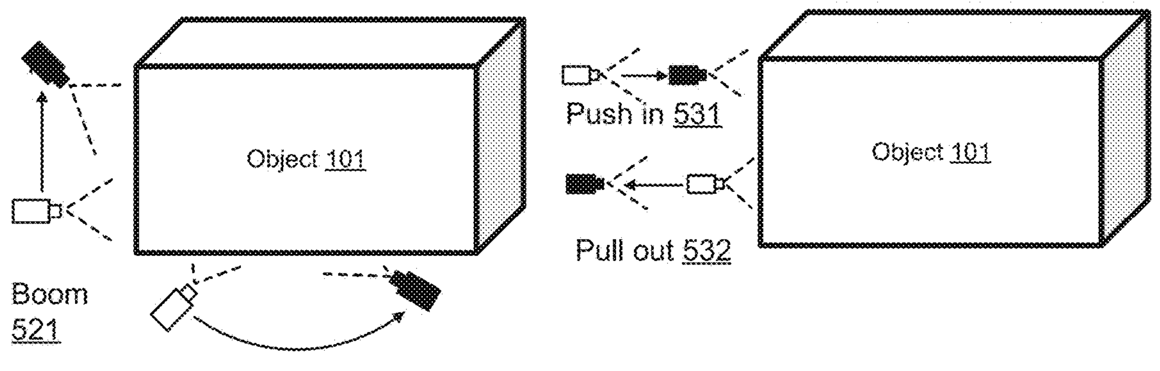
FIG. 5
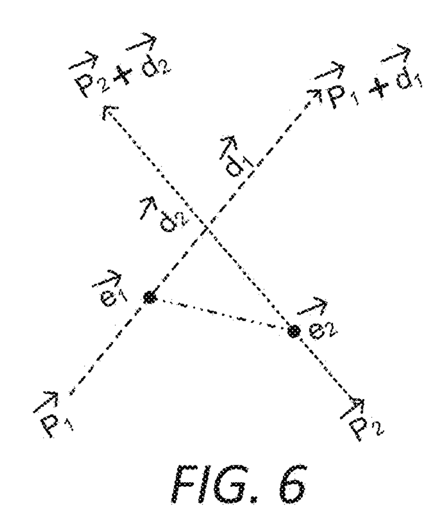
FIG. 6

OBJECT COVERAGE BASED METHOD FOR CAPTURING AN EFFECTIVE SET OF IMAGES FOR 3-D MODELING WITH MOTION FEEDBACK

TECHNICAL FIELD

This disclosure generally relates to techniques for generating a three-dimensional (3D) representations of objects. More specifically, but not by way of limitation, this disclosure relates to capturing a set of two-dimensional (2D) images for generating a 3D representation of an object.

BACKGROUND

Mobile devices have become a valuable tool in 3D modeling processes. Users can access 3D modeling interfaces and scan an object (e.g., a human person, an animal, or other object) using a mobile device camera. Conventional modeling systems can generate a full 3D model of the object from a set of 2D images of the object selected from the 3D scan data.

SUMMARY

The present disclosure describes techniques for generating camera scan data for creating a 3D model of an object during a user computing device camera scan of an object. In certain embodiments, a modeling system accesses, during a camera scan of an three-dimensional (3D) physical object, video feed data of a user computing device includes a plurality of frames. The modeling system generates camera scan data from the video feed data. The camera scan data includes a set of two-dimensional (2D) images of the physical object generated from a subset of the plurality of frames of the video feed data. Generating the camera scan data includes identifying a current frame and a previous frame to the current frame in the video feed data, determining a rotation or a translation between the previous frame and the current frame and, responsive to determining that the rotation is greater than a threshold rotation or responsive to determining that the translation is greater than a threshold translation, including the current frame in the camera scan data. The modeling system constructs, from the camera scan data for display via a user interface of the user computing device, a 3D virtual model of the physical object.

In certain embodiments, a modeling system accesses, during a camera scan of an three-dimensional (3D) physical object, video feed data of a user computing device including a plurality of frames. The modeling system generates camera scan data from the video feed data. The camera scan data includes a set of two-dimensional (2D) images of the physical object generated from a subset of the plurality of frames of the video feed data. Generating the camera scan data includes identifying a current frame and a previous frame to the current frame in the video feed data, determining a camera movement type at a time associated with the current frame, wherein the camera movement type comprises either a desired camera movement type or an undesired camera movement type, and, responsive to determining that the camera movement type corresponds to an undesired camera movement type, excluding a 2D image associated with the current frame from the set of 2D images of the camera scan data. The modeling system constructs, from the camera scan data for display via a user interface of the user computing device, a 3D virtual model of the physical object.

In certain embodiments, a modeling system accesses, during a camera scan of an three-dimensional (3D) physical object, video feed data of a user computing device comprising a plurality of frames. The modeling system generates camera scan data from the video feed data, the camera scan data comprising a set of two-dimensional (2D) images of the physical object generated from a subset of the plurality of frames of the video feed data. Generating the camera scan data includes identifying a current frame in the video feed data, sampling a set of points from a sampling region of the current frame, and identifying a subset of the set of points which are sampled in the current frame and that also sampled in a group of frames comprising predefined number of consecutive frames ending with the current frame. The modeling system generates, for display via the user interface of the user computing device, a model surface coverage preview indicating the subset of points.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts a method for generating camera scan data for creating a 3D model of an object during a user computing device camera scan of an object, according to certain embodiments disclosed herein.

FIG. 5 illustrates types of camera movement including undesired camera movement types, according to certain embodiments described herein.

FIG. 6 depicts a conceptual model of camera movement geometry for use in detecting undesired camera movement types of FIG. 5, according to certain embodiments described herein.

DETAILED DESCRIPTION

Figure 1:
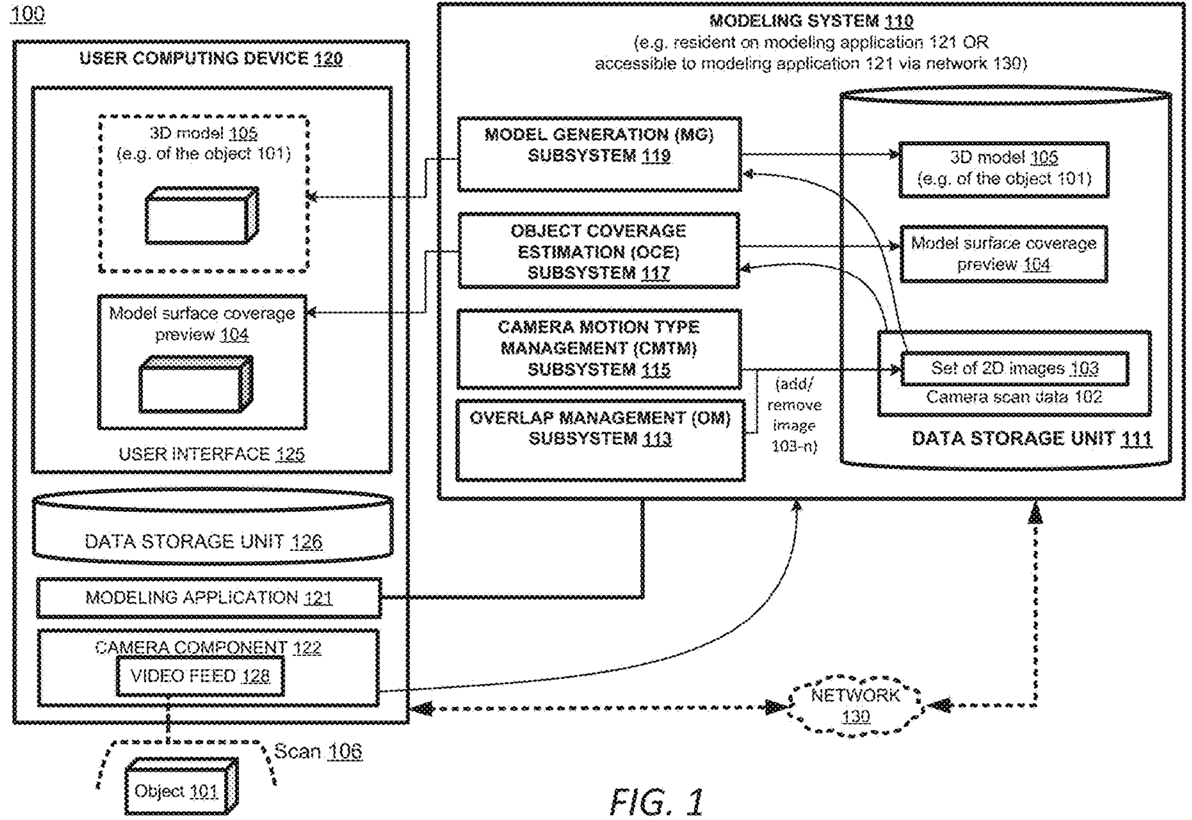
FIG. 1 depicts an example of a computing environment for generating camera scan data for creating a 3D model of an object during a user computing device camera scan of an object, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Conventional modeling interfaces can generate a 3D model of an object (e.g. a human person, an animal, or other object) from a set of 2D images of the object. For example, a user accesses a conventional 3D modeling interface and scans an object with a user device camera. The conventional 3D modeling interface captures, using a user computing device camera, camera scan data including a set of 2D images of the object for generating the 3D model of the object. However, such conventional modeling interfaces do not generate accurate 3D models because the set of 2D images captured in the camera scan data or otherwise selected by such modeling interfaces from the camera scan data suffer from one or more deficiencies. In some instances, conventional modeling interfaces may generate a set of underlying 2D images that do not cover every portion of the surface of the target object, that do not include multiple-angle coverage of each point on the object, that do not include an adequate overlap between images, and/or that are not of a requisite quality and/or resolution. Accordingly, distortions and inaccuracies occur in 3D models generated using these conventional modeling interfaces due to the poor selection and quality of the underlying set of 2D images.

Also, conventional modeling interfaces do not consider the negative effects of user device camera movement data when deciding which images to include in the underlying set of 2D images used to generate the 3D model. Particularly, 2D images captured during certain undesired types of camera movement, such as camera tilt motions and camera pan motions, can cause distortions in the resulting 3D model. Conventional modeling interfaces will include 2D images taken during such undesired camera movement types in the set of images used to generate the 3D model, which reduces the quality of the resulting 3D model. Also, users may not have the coordination to be able to move and orient the camera in such a way as to avoid these undesired camera movements during a scan of an object or may be unaware that such types of camera movement are undesired and negatively impact the resulting 3D model.

Further, conventional modeling interfaces do not display feedback to users to aid users in predicting, during a scan of an object, whether the current user device camera scan data will be able to generate an accurate 3D model of the object. Without such feedback, users may not have the experience or knowledge to know to move and orient the camera in such a way as to scan the object in such a way that provides camera scan data that is adequate for obtaining an underlying set of 2D images that do not suffer from the above-described distortions and inaccuracies. Particularly, conventional modeling interfaces do not warn users when structural features (e.g. folds and crevices) are not adequately captured such that images from multiple viewpoints of these structural features can be selected as a basis for generating the 3D model. Accordingly, such structural features, in conventional modeling interfaces, are not represented accurately (or may not be represented at all) in the final 3D model constructed from 2D images selected from the camera scan data.

Certain embodiments described herein address the limitations of conventional modeling interfaces for generating a 3D model of an object from a set of 2D images extracted from a user device camera scan of the object. For example, the modeling system described herein can provide control over a quality of 2D images included in the camera scan data and avoid 2D images of certain undesirable qualities. For example, the modeling system described herein applies camera translation and camera rotation thresholds for inclusion of a next 2D image in the camera scan data, which ensures a threshold overlap between successive 2D images in the camera scan data. Also, the modeling system described herein applies camera motion type thresholds for inclusion of a next 2D image in the camera scan data, which ensures that successive 2D images captured during undesirable camera movement types (e.g. pan, tilt movement types) are excluded from the camera scan data that underlies generation of the 3D model. Providing these translation, rotation, and movement type thresholds for controlling when successive 2D images are captured for inclusion into the camera scan data provides improved camera scan data over the camera scan data of conventional modeling systems, which may include 2D images which do not include adequate overlap between images or may include images captured during undesired camera movement types. Accordingly, the improved camera scan data for 3D model generation generated according to the embodiments described herein results in a 3D model that is more accurate and has fewer distortions than 3D models generated using conventional modeling systems which do not apply such constraints to the inclusion of successive 2D images in the camera scan data underlying the 3D model.

Also, by constraining when successive 2D images can be captured and included in the camera scan data that can be used for generating the 3D model, the embodiments described herein improve the functionality of the user interface by enabling construction of a quality 3D model even though the user may not be experienced or coordinated enough to perform a user device camera scan of an object that provides optimum translation/rotation of the camera or that avoids undesired types of camera movement. Therefore, if the user were to perform similar movements of the user device camera to perform a scan of an object in both the conventional modeling interface and the improved modeling interface described herein, the improved modeling interface described herein will generate a more accurate 3D model over the conventional modeling interface because of this constraint on the selection of the set of 2D images included in the camera scan data underlying the generated 3D model.

Further, the modeling system described herein ensures that each portion of the object being scanned is captured in the camera scan data from at least a threshold number (N) of view points. For example, an area of the object of interest is only determined to be completely scanned when it is captured in N-consecutive image captures. Using this criteria for object coverage in the camera scan data underlying the generation of the 3D model, the modeling system described herein improves a quality of a 3D model generated using the modeling interface over 3D models generated in a conventional modeling interface in which such selection criteria are not applied. For example, the 3D models generated using the methods described herein reduce or eliminate distortions that occur in 3D models generated by conventional modeling interfaces, which do not ensure coverage in the camera scan data of each surface point of an object from a requisite number of angles.

The modeling system described herein also improves the underlying set of 2D images for generating a 3D model through providing improved user interface functionality, including providing the user with feedback on object coverage and/or camera movement type during a user device scan of the target object. This improves the functionality of the user interface over conventional modeling interfaces, especially for novice users may not understand how to conduct a scan in order to obtain adequate surface area coverage of the object and/or avoid undesirable camera movements during the scan which reduce the quality of the set of 2D images captured for 3D model construction. Also, even knowledgeable users may lack the coordination to avoid the undesirable camera movements or may be unsure if a specific region of the scanned object has adequate coverage from the 2D images captured in the scan. The modeling system described herein advises the user during the scan of the object when the user conducts an undesired camera movement and the user is likely to capture, via the user device, improved 2D images after being advised regarding undesirable camera movement. Therefore, the quality of sets of 2D images captured for 3D model generation during scanning is improved over conventional modeling interfaces by notifying the user of undesirable camera movement.

The modeling system described herein also provides a preview to the user during the scan of the object that indicates whether the set of 2D images captured so far in the user device camera scan of an object provides adequate coverage of the surface of the object for generation of an accurate 3D model. For example, the preview indicates each point or region of the surface of the object that has been captured in N-consecutive images of the camera scan data. Alternatively or additionally to indicating the portions of the surface of the object that have been captured in N-consecutive images of the camera scan data, the modeling system described herein can indicate each point or portion of the surface of the object that has not been captured in N-consecutive images of the camera scan data. As the user device continues to capture 2D images of the object to add to the camera scan data, the modeling system described herein can update the preview of the surface of the object and the indicated portions of the surface that are (or are not) adequately covered in the camera scan data that underlies the 3D model. Providing the preview by the modeling interface described herein is an improvement in the functionality of the user interface over conventional systems which have no such guidance in obtaining adequate underlying camera scan data for generation of 3D models. Providing the surface preview is particularly helpful in objects having certain surface geometry features (e.g. folds and crevices) of objects, which may require multiple-angled 2D images to accurately reflect such features in the resulting 3D model. Providing the preview to the user enables the user to conduct a scan of the object in such a way as to obtain an accurate 3D reconstruction of the object including such features whereas, in conventional modeling interfaces without such a preview, the user is not likely to obtain camera scan data that supports generation of a 3D model that accurately represents such special features of the object.

The following non-limiting example is provided to introduce certain embodiments. In this example, a modeling system accesses a video feed of a user computing device during a scan of an object. For example, the modeling system is associated with a modeling application resident on the user computing device. In some embodiments, the modeling system is a component of the modeling application and, in other embodiments, the modeling system is separate from the modeling application and communicates with the modeling application over a network. In some instances, a user of the user computing device accesses the modeling application via a user interface of the user computing device and selects an option to scan an object. Examples of an object include a person, a piece of furniture, a plant, a pet, a toy, a tool, or other object to be scanned by the user. Responsive to receiving a selection of the option to scan the object, the modeling application activates a camera of the user computing device, which records and transmits a live video feed to the modeling system. In some instances, the user orients and/or moves the user computing device to scan the object so that the video feed captures the object from multiple perspectives and angles.

The modeling system generates, during the scan of the object, camera scan data comprising a set of two-dimensional (2D) images. For example, during the scan of the object, the modeling system adds 2D images captured by the user computing device camera to the camera scan data. In some instances, generating the camera scan data includes controlling an addition of 2D images to the camera scan data using velocity and rotation/translation thresholds. For example, the modeling system ensures that an adequate overlap between images in the camera scan data exists by only adding a next 2D image to the camera scan data when the user computing device velocity is less than a threshold velocity and a rotation (or translation) of the next 2D image over the previous 2D image in the camera scan data is greater than a threshold rotation (or threshold translation). In some instances, generating the scan data includes removing 2D images in the camera scan data that are captured during undesired camera motion types. For example, the modeling system removes 2D images from the camera scan data which are captured during a pan movement, a tilt movement, or other predefined undesired movement type of the user computing device camera. In some instances, generating the scan data includes generating, for display via a user interface of the user computing device during generation of the camera scan data, a model surface coverage preview, wherein the model surface coverage preview indicates portions of a surface of the object depicted in at least a threshold number of consecutive 2D images in the camera scan data. For example, the user can view an evolution of the model surface coverage preview while conducting the scan of the object to determine the adequacy of the camera scan data for modeling all portions of the surface of the object.

The modeling system generates a three-dimensional (3D) model of the object based on the camera scan data. For example, 3D model depicts the object that was scanned by the user computing device camera. The modeling system generates the 3D model based on the set of 2D images in the camera scan data. The modeling system displays, via the user interface of the user computing device, the generated 3D model of the object. In some instances, the user can select one or more options on the user interface to view the 3D model from a variety of perspectives (e.g. front, behind, left, right, above, etc.).

As previously discussed, 3D models of objects generated by conventional modeling systems include distortions in surface features caused by a lack of overlap between underlying 2D images from which the models are constructed, by use of underlying 2D images captured during undesired (e.g. tilt, pan, etc.) camera movement types, and by lack of guidance to a user during the scan. The embodiments described herein address these deficiencies of the conventional 3D model generation processes by incorporating features of controlling an addition of 2D images to the camera scan data using velocity and rotation/translation thresholds, removing 2D images in the camera scan data that are captured during undesired camera motion types, and displaying a model surface coverage preview during the scan indicating portions of a surface of the object depicted in at least a threshold number of consecutive 2D images in the camera scan data. Incorporating these features improves an accuracy of the 3D model generated using the embodiments described herein over 3D models generated using conventional modeling interfaces.

Example Operating Environment for Generating Camera Scan Data for Creating a 3D Model of an Object During a User Computing Device Camera Scan of the Object Referring now to the drawings, FIG. 1 depicts an example of a computing environment 100 for using generating camera scan data 102 for creating a 3D model 105 of an object 101 during a user computing device camera scan of the object, according to certain embodiments disclosed herein. The computing environment 100 includes, as depicted in FIG. 1, a modeling system 110, which can include one or more processing devices that execute an overlap management (OM) subsystem 113, a camera motion type management (CMTM) subsystem 115, an object coverage estimation (OCE) subsystem 117, and a model generation (MG) subsystem 119. In certain embodiments, the modeling system 110 is a component of a user computing device 120 and operates on the user computing device 120. In certain embodiments, as also depicted in FIG. 1, the modeling system 110, including the OM subsystem 113, the CMTM subsystem 115, the OCE subsystem 117, the MG subsystem 119, and the data storage unit 111, is a network server or other computing device that is accessible to the user computing device 120 and communicates with the user computing device 120 via a network 130.

The modeling system 110 includes the MG subsystem 119 that generates a 3D model 105 of an object 101 based on camera scan data 102, including a set of 2D images, generated by the modeling system 110. In some instances, the MG subsystem 119 generates a 3D model 105 by applying a machine learning model to the camera scan data 102. The MG subsystem 119 can display the generated 3D model 105 on a user interface 125 of the user computing device 120. The 3D model 105, in some instances, can be viewed from a plurality of viewing angles. For example, viewing angles can include a front view, a side view, a back view, or other views of the 3D representation 103 of the object. In some instances, the MG subsystem 119 stores the generated 3D model 105 in the data storage unit 111.

The modeling system 110 includes the OM subsystem 113 and the CMTM subsystem 115, which generate, during a scan 106 of the object 101 by the user computing device 120, camera scan data 102 for use in generating a 3D model 105. Generating the camera scan data 102 can include determining to add one or more 2D images 103 to the camera scan data 102 and/or removing one or more 2D images 103 to the camera scan data 102.

In some embodiments, the modeling system 110 can execute an augmented reality (AR) software development kit (SDK) to continuously capture video frames from the camera component 122 of the user computing device 120 as well as determine the user computing device's 110 position and motion. An example of an AR SDK is ARKit. However, other AR SDKs may be used. For example, ARKit recognizes notable features in the frame, tracks differences in the positions of those features across video frames, and compares that information with motion sensing data of the user computing device 110 to determine a high-precision model of the user computing device's 110 position and motion.

In certain embodiments, the OM subsystem 113 determines whether to include, in the camera scan data 102, a 2D image 103 associated with a current frame received from the camera component 122. For example, the OM subsystem 113 determines, based on camera transform data determined using the AR SDK (e.g. ARKit), if the camera component 122, at the current frame, has moved beyond a predetermined translation and rotation threshold since the previous frame. If the camera component 122 has exceeded the predetermined translation threshold or the predetermined rotation threshold, the OM subsystem 113 captures a high resolution frame for the current frame. The automatic image capturing by the OM subsystem 113 triggered by these predetermined translation and rotation thresholds ensures that an amount of overlap between and a significant parallax difference between consecutive images in the final camera scan data 102 exists. Further details about applying translation and rotation thresholds to control addition of frames (and, ultimately, 2D images 103) to the camera scan data 102 are described in FIG. 3.

In certain embodiments, the CMTM subsystem 115 excludes, from the camera scan data 102, 2D images 103 associated with frames received from the camera component 122 in which the camera component 122 has performed or is performing an undesired camera movement type. An example of an undesired camera movement type is a pan, which involves turning the camera horizontally from a fixed position. Another example of an undesired camera movement type is a tilt, which involves turning the camera vertically from a fixed position. An illustration of camera movements, including undesired camera movements, is provided in FIG. 6. Performing undesired camera movements during a scan 106 of the object 101 could negatively impact an accuracy of a 2D image 103 captured at a frame at which the undesired camera movement occurred. For example, the CMTM subsystem 115 determines, based on camera transform data determined using the AR SDK (e.g. ARKit), if the camera component 122, at the current frame, is experiencing or experienced an undesired camera movement type. The CMTM subsystem 115 discards frames received from the camera component 122 associated with detected undesired camera movement type and does not include these frames in the camera scan data 102. In certain embodiments, responsive to detecting undesired camera movement type associated with a frame, the CMTM subsystem 115 displays, via the user interface 125 of the user computing device 120, an alert informing the user of the undesired camera movement type. Further details about determining whether undesired camera movement occurred during a frame, excluding a frame occurring during undesired camera movement, and displaying an alert associated with undesired camera movement are described in FIG. 4.

In certain embodiments, the OCE subsystem 117 generating, for display via a user interface 125 of the user computing device 120 during generation of the camera scan data 102, a model surface coverage preview 104, wherein the model surface coverage preview 104 indicates portions of a surface of the object 101 depicted in at least a threshold number of consecutive 2D images 103 in the camera scan data. As the modeling system 110 receives new frames from the camera component 122, the OCE subsystem 117 can update the model surface coverage preview 104. For example, the user can view an evolution of the model surface coverage preview 104 while conducting the scan of the object to determine the adequacy of the camera scan data 102 for modeling all portions of the surface of the object. Further details about generating the model surface coverage preview 104 are described in FIG. 5.

The modeling system 110 includes a data storage unit 111. An example data storage unit 111 is accessible to the modeling system 110 and stores data for the modeling system 110. In some instances, the data storage unit 111 stores camera scan data 102 generated by the modeling system 110 from video feed data 128 received from the camera component 122 of the user computing device 120. The camera scan data 102 comprises a set of 2D images 103 used to construct a 3D model 105 of the scanned object 101. In some instances, the data storage unit 111 stores the model surface coverage preview 104 and in some instances, one or more updates to the model surface coverage preview 104 performed during the scan 106 of the object 101. In some instances, the data storage unit 111 stores the 3D model 105 generated from the set of 2D images 103 of the camera scan data 102.

An example user computing device 120 includes a modeling application 121, a camera component 122, a user interface 125, and a data storage unit 126. In certain embodiments, the user computing device 120 is a smart phone device, a personal computer (PC), a tablet device, or other user computing device 120. In some embodiments, the user computing device 120, as depicted in FIG. 1, includes the modeling system 110. For example, the OM subsystem 113, the CMTM subsystem 115, the OCE subsystem 117, and the MG subsystem 119 are components of the modeling application 121 and the data storage unit 126 performs functions described herein as being performed by the data storage unit 111. However, in other embodiments, as also depicted in FIG. 1, the user computing device 120 is a separate system from the modeling system 110 and communicates with the modeling system 110 via the network 130.

The modeling application 121, in some embodiments, is associated with a 3D modeling service and the user downloads the modeling application 121 on the user computing device 120. For example, the user accesses an application store or a website of a 3D modeling service using the user computing device 120 and requests to download the modeling application 121 on the user computing device 120. The modeling application 121 operates on the user computing device 120 and enables a user of the user computing device 120 to generate a 3D model 105 of an object 101 by scanning the object 101 with the user computing device camera component 122. The modeling application 121 enables the user to interact, via the user interface 125 with the modeling application 121. The modeling application 121 can communicate with the user interface 125 to receive one or more inputs from the user. The modeling application 121 can instruct the user interface 125 to display the 3D model 105 generated based on camera scan data 102 generated by the modeling system 110 during the scan 106 of the object 101. In some embodiments, the modeling application 121 can instruct the user interface 125 to display a model surface coverage preview 104 during the scan 106 of the object 101. In some embodiments, the modeling application 121 communicates with one or more of the OM subsystem 113, the CMTM subsystem 115, the OCE subsystem 117, and the MG subsystem 119 of the modeling system 110.

In certain embodiments, the modeling application 121 includes the OM subsystem 113, the CMTM subsystem 115, the OCE subsystem 117, and the MG subsystem 119 and performs the operations described herein as being performed by the subsystems 113, 115, 117, and 119. For example, in certain embodiments, the modeling application 121 of the user computing device 120 generates camera scan data 102 and generate a 3D model 105 based on the camera scan data 102.

In certain embodiments the camera component 122 is a camera module or camera device component of the user computing device 120 that is able to capture images and/or video of an environment of the camera component 122. In some embodiments, the camera component 122 is a separate device from the user computing device 120 and is communicatively coupled to the user computing device 120. The camera component 122 communicates with the modeling application 121 and transmits, to the modeling application 121, video frames of a captured video feed 128 of an environment of the camera component 122. For example, the environment includes the object 101 being scanned for which the user desires to generate a 3D model 105.

The data storage unit 126 is accessible to the user computing device 120 and stores data for the user computing device 120. In some instances, the data storage unit 126 stores a camera scan data 102 generated by the modeling system 110, including a set of 2D images 103 used to generate a 3D model 105. In some instances, the data storage unit 126 stores the 3D model 105 generated from the camera scan data 102. In some instances, the data storage unit 126 stores a model surface coverage preview 104 generated during the scan 106 of the object 101.

The user interface 125 can include a touchscreen display interface, a display device (e.g., a monitor) with a separate input device (e.g., a mouse), or other user interface 123 which can receive one or more inputs from the user and display information or provide other output to the user. For example, the user interface 125 can display a model surface coverage preview 104 generated by, and continuously updated by, the modeling system 110 during a user computing device camera component scan 106 of the object 101. In some instances, the user interface 123 displays a 3D model 105 that is generated by the modeling system 110. In some instances, the user interface 125 displays one or more user interface 125 objects that are selectable by the user and enable the user to interact with the modeling application 121. In some instances, the user interface 125 displays alerts generated by the modeling system 110 (or by one or more subsystems thereof) during the scan 106 of the object 101. For example, the user interface 125 can display an alert that the camera component 122 is moving too fast based on the OM subsystem 113 determining that the camera component 122 velocity is greater than a threshold amount. For example, the user interface 125 can display an alert that an undesired camera movement type (e.g. pan or tilt movement) has been detected responsive to the CMTM subsystem 115 detecting the undesired camera movement type.

As depicted in FIG. 1, the modeling system 110 can receive video feed 128 data from camera component 122 of the user computing device 120 during a scan 106 of the object 101. During the scan 106, the user may move and/or orient the user computing device 120 to capture the object 101 in the video feed 128 data from a variety of perspectives. In some instances, the video feed 128 data is captured by the camera component 122 of the user computing device 120. The modeling system 110 can generate camera scan data 102 comprising a set of 2D images 103 to use to generate a 3D model 105 of the object. Further details about generating the camera scan data 102 are described in FIG. 2. During the scan 106 of the object 101, the modeling system 110 can generate a model surface coverage preview 104 based on the camera scan data 102 and can display the model surface coverage preview 104 via the user interface 125. As the scan 106 progresses and more camera scan data 102 is generated, the modeling system 110 can update the model surface coverage preview 104 based on the camera scan data 102 and can display the updated model surface coverage preview 104 via the user interface 125. The modeling system 110 can also store the model surface coverage preview 104 and one or more updates to the preview 104. Based on the set of 2D images 103 of the camera scan data 102, the modeling system 110 generates a 3D model 105 of the object 101 and displays the 3D model 105 via the user interface 125. The modeling system 110 can also store the 3D model 105 in the data storage unit 111.

The modeling system 110, including the OM subsystem 113, the CMTM subsystem 115, the OCE subsystem 117, and the MG subsystem 119, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of ordinary skill in the art would recognize many possible variations, alternatives, and modifications. For example, in some implementations, the modeling system 110 can be implemented using more or fewer systems or subsystems than those shown in FIG. 1, may combine two or more subsystems, or may have a different configuration or arrangement of the systems or subsystems.

Examples of Computer-Implemented Operations for Generating Camera Scan Data for Creating a 3D Model of an Object During a User Computing Device Camera Scan of an Object In the embodiments described herein, the modeling system 110 can generate, during a scan 106 of an object 101, camera scan data 102 including a set of 2D images 103 that can be used to generate a 3D model 105 of the object 101. FIG. 2 depicts a method for generating camera scan data for creating a 3D model of an object during a user computing device camera scan of an object according to certain embodiments disclosed herein. One or more computing devices (e.g., the modeling system 110 or the individual subsystems contained therein) implement operations depicted in FIG. 2. For illustrative purposes, the method 200 is described with reference to certain examples depicted in the figures. Other implementations, however, are possible.

At block 210, the method 200 involves accessing, by the modeling system 110 during a scan 106 of an object 101, a video feed 128 of a user computing device 110. In some instances, a user of the user computing device 120 accesses the modeling application 121 via a user interface 125 of the user computing device 120 and selects an option to perform a scan 106 an object 101. Examples of an object 101 include a person, a piece of furniture, a plant, a pet, a toy, a tool, or other object to be scanned by the user. Responsive to receiving a selection of the option to scan the object 101, the modeling system 110 activates a camera component 122 of the user computing device, which records and transmits a live video feed 128 to the modeling system 110. In some instances, during the scan 106, the user orients and/or moves the user computing device to scan the object 101 so that the video feed 128 captures the object from multiple perspectives and angles. In certain embodiments, accessing the video feed 128 data includes executing an augmented reality (AR) software development kit (SDK) to continuously capture video frames from the camera component 122 video feed 128 as well as determine the user computing device's 120 position and motion. An example of an AR SDK is ARKit. However, the modeling system 110 could execute another AR SDK other than ARKit. For example, ARKit recognizes notable features in the frame, tracks differences in the positions of those features across video frames, and compares that information with motion sensing data of the user computing device 110 to determine a high-precision model of the user computing device's 110 position and motion.

At block 220, the method 200 involves generating, by the modeling system 110 during the scan 106 of the object, camera scan data 102 comprising a set of two-dimensional (2D) images 103. The modeling system generates, during the scan of the object, camera scan data comprising a set of two-dimensional (2D) images. For example, during the scan of the object, the modeling system adds 2D images 103 corresponding to frames captured by the user computing device camera in the video feed 128 to the camera scan data.

Each of subblocks 223 (corresponding to method 300 of FIG. 3), 225 (corresponding to method 400 of FIG. 4), and 227 (corresponding to method 800 of FIG. 8) describe methods for generating camera scan data 102 that is improved over camera scan data generated by conventional systems.

Figure 3:
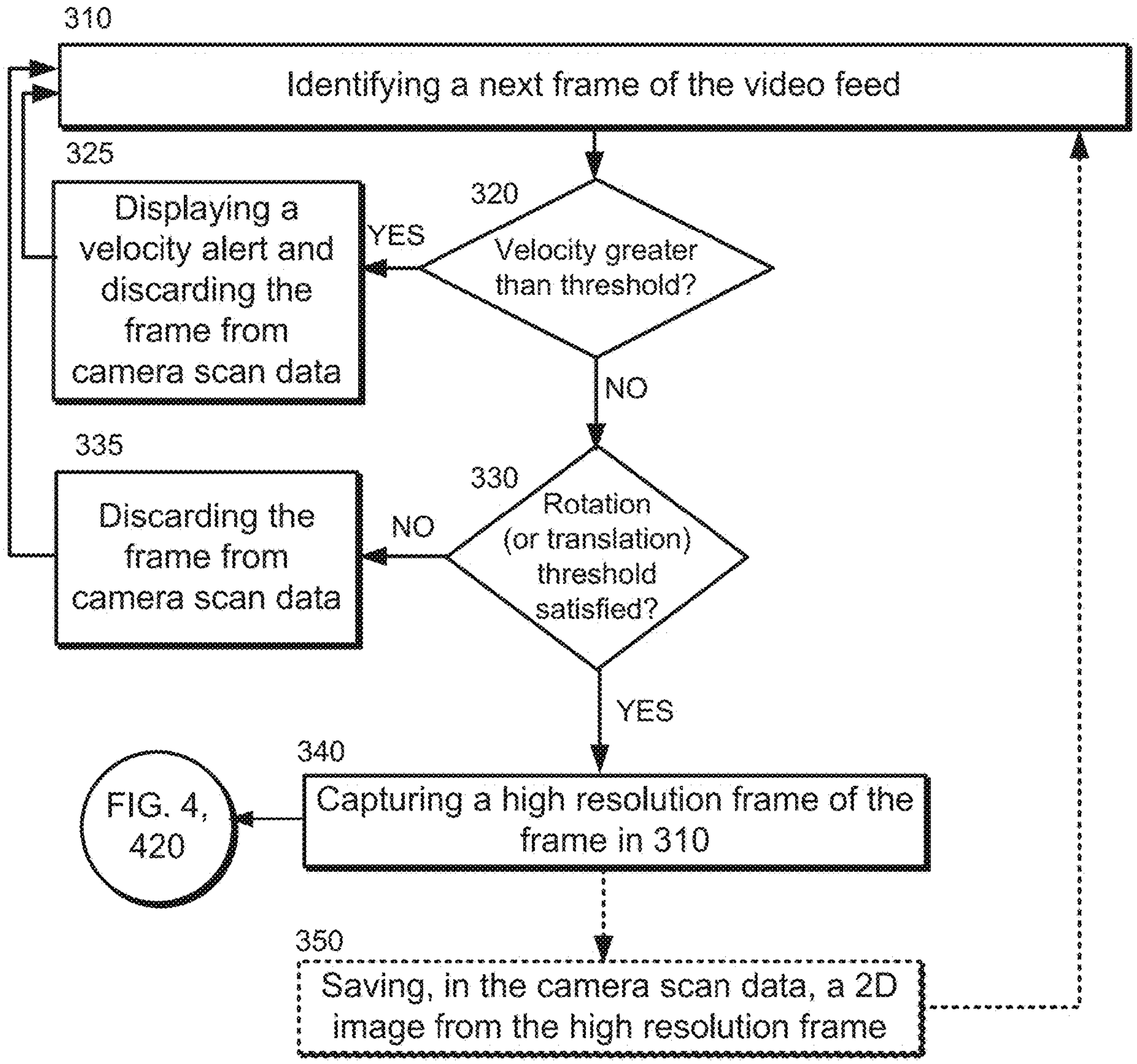
FIG. 3 depicts a method for adding 2D images to camera scan data based on user computing device velocity and rotation thresholds, according to certain embodiments disclosed herein.

In certain embodiments, the method 200 at block 220 includes implementing subblock 223. At subblock 223, the method 200 involves controlling, by the modeling system 110, an addition of 2D images 103 to the camera scan data 102 using velocity and rotation/translation thresholds. For example, the modeling system 110 ensures that an adequate overlap between 2D images 103 in the camera scan data exists by only adding a next 2D image to the camera scan data when the user computing device velocity is less than a threshold velocity and a rotation (or translation) of the next 2D image over the previous 2D image in the camera scan data is greater than a threshold rotation (or threshold translation). In some instances, the modeling system 110 accesses, for each new frame of the video feed 128 received from the camera component 122, velocity, translation, and/or rotation data determined via executing an AR SDK (e.g. ARKit). For example, the AR SDK determines a camera transform and the modeling system 110 determines translation and rotation values from the camera transform. FIG. 3, which depicts a method for adding 2D images to camera scan data based on user computing device velocity and rotation thresholds, provides further details explaining how subblock 223 can be implemented.

Figure 4:
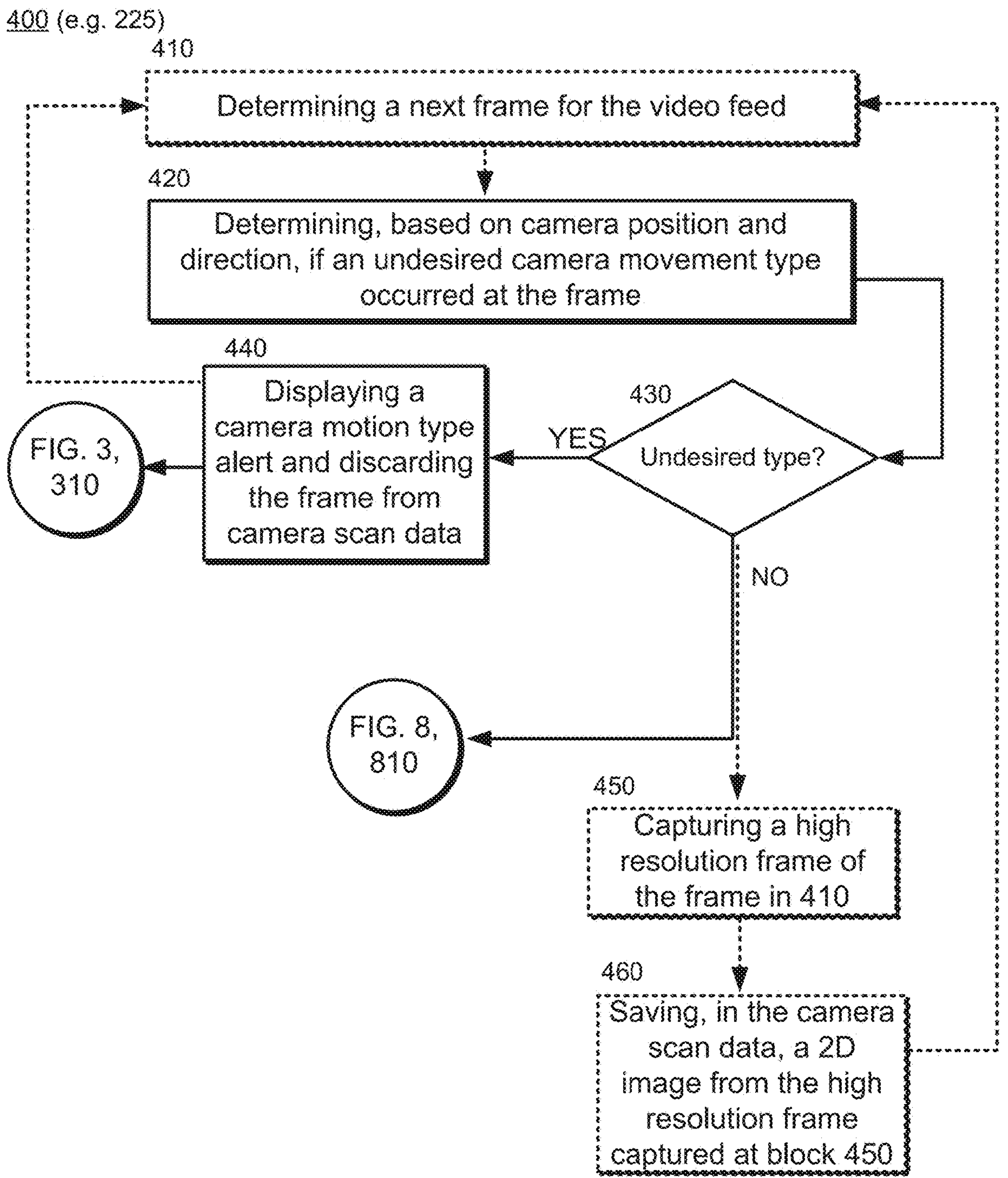
FIG. 4 depicts a method for excluding 2D images corresponding to undesired camera movement type from camera scan data, according to certain embodiments described herein.

In certain embodiments, the method 200 at block 220 includes implementing subblock 225. At subblock 225, the method 200 involves removing, by the modeling system 110, 2D images 103 in the camera scan data 102 captured during undesired camera movement types. In some instances, the modeling system 110 determines, for each new frame of the video feed 128 received from the camera component 122, a camera movement type (if any camera movement is detected) between a previous frame and the new frame. Example undesired camera movement types include pan movements and tilt movements of the camera component 122. FIG. 4, which depicts a method for excluding 2D images corresponding to undesired camera movement type from camera scan data, provides further details explaining how subblock 225 can be implemented.

Figure 8:
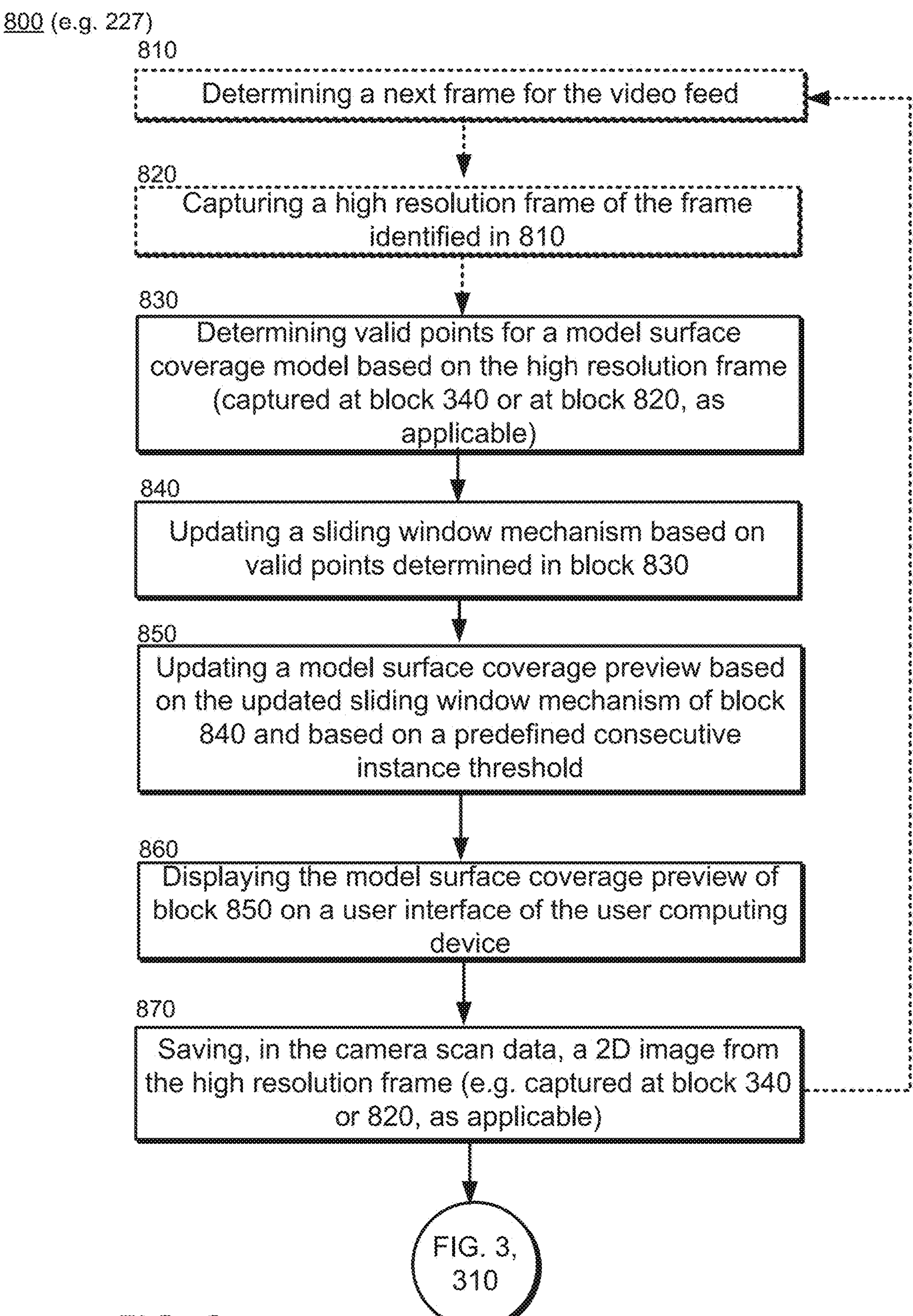
FIG. 8 depicts a method for generating, for display during a scan of an object, a model surface coverage preview indicating surface points of the object captured in the camera scan data in at least a threshold number of 2D images, according to certain embodiments described herein.

In certain embodiments, the method 200 at block 220 includes implementing subblock 227. At subblock 227, the method 200 involves generating, by the modeling system 110 for display via a user interface 125 of the user computing device 120 during generation of the camera scan data 102, a model surface coverage preview 104, the model surface coverage preview 104 indicating portions of a surface of the object 101 depicted in at least a threshold number of consecutive 2D images 103 in the camera scan data 102. In some instances, as modeling system 110 augments the camera scan data 102 during the scan 106, the user can view an evolution of the model surface coverage preview 104 to determine the adequacy of the camera scan data 102 for modeling all portions of the surface of the object 101. FIG. 8, which depicts a method for generating, for display during a scan of an object, a model surface coverage preview indicating surface points of the object captured in the camera scan data in at least a threshold number of 2D images, provides further details explaining how subblock 227 can be implemented.

In certain embodiments, as depicted herein, the features performed in subblocks 223, 225, and 227 (corresponding to FIG. 3, FIG. 4, FIG. 8, respectively) can be performed together. For example, the modeling system 110 can provide improved camera scan data 102 through features of (A) adding 2D images to camera scan data based on user computing device velocity and rotation thresholds, corresponding to subblock 223, (B) excluding 2D images corresponding to undesired camera movement type from camera scan data, corresponding to subblock 225, and (C) generating, for display during a scan of an object, a model surface coverage preview indicating surface points of the object captured in the camera scan data in at least a threshold number of 2D images, corresponding to subblock 227. However, in this example, each of the subblocks 223, 225, and 227 could also be performed alone without performing one or both of the other two methods. In FIG. 3 (corresponding to subblock 223), FIG. 4 (corresponding to subblock 225), and FIG. 8 (corresponding to subblock 227), as depicted herein, dashed lines and boxes indicate additional steps for performing the respective method 300, 400, or 800 by itself without performing it in conjunction with the other two methods. In embodiments where the modeling system 110 practices the three methods 300, 400, and 800 in conjunction, the dashed lines and boxes in FIG. 3, FIG. 4, and FIG. 8 can be ignored.

At block 230, the method 200 involves generating, by the modeling system 110, a three-dimensional (3D) model 105 of the object 101 based on the camera scan data 102 generated at block 220. For example, the 3D model 105 represents the object 101 that was scanned by the user computing device camera component 122. The modeling system 110 generates the 3D model 105 based on the set of 2D images 103 in the camera scan data 104. In some instances, the modeling system 110 stops the scan 106 of the object 101 responsive to receiving an input via the user interface 125 from the user, extracts the set of 2D images 103 from the camera scan data 102, and generates the 3D model 105 based on the set of 2D images 103. In some embodiments, generating the 3D model 105 involves applying a machine learning model to the set of 2D images 103.

At block 240, the method 200 involves displaying, by the modeling system 110 via a user interface 125 of the user computing device 110, the 3D model 105 generated at block 230. In some instances, the user can select one or more options on the user interface 125 to change a view of the 3D model 105. For example, responsive to receiving inputs via the user interface 125, the modeling system 110 can change the angle of view of the 3D model 105 to a variety of perspectives (e.g. front, behind, left, right, above views, etc.).

FIG. 3 depicts a method for adding 2D images to camera scan data based on user computing device velocity and rotation thresholds, according to certain embodiments disclosed herein. One or more computing devices (e.g., the modeling system 110 or the individual subsystems contained therein) implement operations depicted in FIG. 3. For illustrative purposes, the method 300 is described with reference to certain examples depicted in the figures. Other implementations, however, are possible.

At block 310, the method 300 involves identifying, by the OM subsystem 113, a next frame of the video feed 128. For example, the OM subsystem 113 executes an AR SDK to continuously capture video frames from the camera component 122 video feed 128 as well as determine the user computing device's 120 position and motion. The AR SDK recognizes notable features in the frame, tracks differences in the positions of those features across video frames, and compares that information with motion sensing data of the user computing device 110 to determine a high-precision model of the user computing device's 110 position and motion.

At block 320, the method 300 involves determining, by the OM subsystem 113, if the velocity of the user computing device 110 is greater than a threshold velocity. For example, the OM subsystem 113 determines the velocity of the user computing device 110 from the AR SDK data associated with the current frame (the "next frame" identified in block 310). The threshold velocity could be any predetermined value. In some embodiments, the threshold velocity value can be preconfigured before conducting the scan 106 of the object 101. Setting the threshold velocity value to lower values results in more overlap between images but may result in an overall longer scan 106 duration. Setting the threshold velocity value to higher values results in less overlap between images but may reduce the time duration of the scan 106. Further, setting the velocity threshold to lower values reduces an amount of blurred images that can result from camera movement. An example of a velocity threshold value is 0.5 meters per second. However, other velocity threshold values can be used.

If the OM subsystem 113 determines that the user computing device 110 velocity is greater than the threshold velocity, the method 300 proceeds to block 325. For example, the OM subsystem 113 compares the velocity of the user computing device 110 to the threshold velocity and determines that the user computing device 110 velocity is greater than the threshold velocity.

At block 325, the method 300 involves displaying, by the OM subsystem 113, a velocity alert and discarding the frame from the camera scan data 102. For example, the OM subsystem 113 displays, via the user interface 125 an alert to the user that the velocity threshold has been exceeded. For example, the alert may read "please move device more slowly," "device moving too fast," or other such language to alert the user that the user computing device 110 velocity is too fast or that the user computing device 110 velocity is greater than the threshold velocity. In some instances, discarding the frame from the camera scan data 102 comprises not saving a 2D image 103 associated with the frame in the camera scan data 102. Accordingly, the no 2D image 103 is captured for the frame and the frame does not influence generation of the 3D model 105.

From block 325, the method 300 returns to block 310. At block 310, the OM subsystem 113 identifies the next frame of the video feed 128. For example, after performing block 325, the OM subsystem 113 identifies the subsequent frame in the video feed 128 that follows the frame that was identified the previous instance at which the OM subsystem 113 performed block 310. The OM subsystem 113 then performs block 320 of method 300 for the subsequent frame.

Returning to block 320, if the OM subsystem 113 determines that the user computing device 110 velocity is less than the threshold velocity, the method 300 proceeds to block 330. For example, the OM subsystem 113 compares the velocity of the user computing device 110 to the threshold velocity and determines that the user computing device 110 velocity is less than the threshold velocity.

At block 330, the OM subsystem 113 determines if a rotation (or translation) threshold is satisfied for the frame identified at block 310. For example, the translation threshold could be 4 cm, 6 cm, 7.5 cm, 8.7 cm, 10 cm, or other predetermined value. In some instances, the rotation or translation threshold is predefined such that a 70% overlap between fields of view associated with two subsequent captured frames. In some instances, the OM subsystem 113 dynamically determines the translation threshold based on a center point distance from the surface of the object 101 being scanned to the camera component 122 of the user computing device 120. For example, the rotation threshold could be 5 degrees, 6 degrees, 7 degrees, 9 degrees, 12 degrees or other angle. For example, in some instances, 60 images around the object 101 provides for an accurate 3D model 105 and therefore the rotation threshold is set at 6 degrees (e.g. 360 degrees divided by 60 images to render 6 degrees rotation for each image). In some embodiments, the OM subsystem 113 compares the frame identified at block 310 to the previous frame to determine a translation between the frames. In some embodiments, the OM subsystem 113 compares the frame identified at block 310 to the previous frame to determine a rotation between the frames. The determined rotation or the determined translation between the frames is compared to a corresponding rotation threshold or translation threshold, as applicable.

If the OM subsystem 113 determines that the rotation between the frame identified in block 310 and the previous frame in the video feed 128 is less than the threshold rotation, the method 300 proceeds to block 335. For example, the OM subsystem 113 compares the rotation between the frames and determines that the rotation is less than the threshold rotation. In another embodiment, if the OM subsystem 113 determines that the translation between the frame identified in block 310 and the previous frame in the video feed 128 is less than the threshold translation, the method 300 proceeds to block 335. For example, the OM subsystem 113 compares the translation between the frames and determines that the translation is less than the threshold translation.

At block 335, the method 300 involves discarding, by the OM subsystem 113, the frame identified at block 310 from the camera scan data 102.

From block 335, the method 300 returns to block 310. At block 310, the OM subsystem 113 identifies the next frame of the video feed 128. For example, after performing block 335, the OM subsystem 113 identifies the subsequent frame in the video feed 128 that follows the frame that was identified the previous instance at which the OM subsystem 113 performed block 310. The OM subsystem 113 then performs blocks 320 and 330, as applicable, of method 300 for the subsequent frame.

Returning to block 330, if the OM subsystem 113 determines that the rotation between the frame identified in block 310 and the previous frame in the video feed 128 is greater than the threshold rotation, the method 300 proceeds to block 340. In another embodiment, if the OM subsystem 113 determines that the translation between the frame identified in block 310 and the previous frame in the video feed 128 is greater than the threshold translation, the method 300 proceeds to block 340.

At block 340, the method 300 involves capturing, by the OM subsystem 113, a high resolution frame identified at block 310. Capturing the high resolution frame involves capturing a live image that is of a higher resolution (and therefore, a higher quality) compared to the frames that are received from applying the AR SDK to the camera component video feed data. For example, the AR SDK determines frames for processing at a predetermined rate (e.g. 60 frames per second or other predetermined rate) and each frame includes an image and position tracking data. In some embodiments, the AR SDK provides one or more application programming interfaces (APIs) for requesting a frame outside of the predetermined rate that comprises a high-resolution captured image.

In embodiments in which the modeling system 110 performs method 300 along with methods 400 and 800 of FIG. 4 and FIG. 8, after block 340 the method 300 proceeds to block 420 of FIG. 4. Also, in embodiments in which the modeling system performs method 300 along with method 400 but does not perform method 800, after block 340 the method 300 proceeds to block 420. Also, in embodiments in which the modeling system performs method 300 along with method 800 but does not perform method 400, after block 340 the method 300 proceeds to block 830 of FIG. 8.

In embodiments where the method 300 is performed alone without performing the methods 400 and 800, after block 340 the method 300 proceeds to block 350 and then, after block 350, returns to block 310. At block 350, the method 300 involves saving, by the OM subsystem 113 in the camera scan data 102, a 2D image 103 from the high resolution frame. Accordingly, in embodiments where the method 300 is performed alone without performing the methods 400 and 800, the OM subsystem 113 captures a new high resolution frame each time velocity and rotation/translation thresholds are satisfied and then saves a 2D image 103 from the high resolution frame in the camera scan data 102. After iteratively performing method 300, the OM subsystem 113 has generated camera scan data 102 comprising a set of 2D images 103.

FIG. 4 depicts a method for excluding 2D images corresponding to undesired camera movement type from camera scan data, according to certain embodiments described herein. One or more computing devices (e.g., the modeling system 110 or the individual subsystems contained therein) implement operations depicted in FIG. 4. For illustrative purposes, the method 400 is described with reference to certain examples depicted in the figures. Other implementations, however, are possible.

In embodiments where methods 300 and 800 of FIG. 3 and FIG. 8, respectively, are not performed, the method 400 begins at block 410. Also, in embodiments in which the modeling system 110 performs method 300 along with method 800 of FIG. 8 but does not perform method 300 of FIG. 3, the method 400 begins at block 410.

At block 410, the method 400 involves determining, by the CMTM subsystem 115, a next frame for the video feed 128. For example, the OM subsystem 113 executes an AR SDK to continuously capture video frames from the camera component 122 video feed 128 as well as determine the user computing device's 120 position and motion. The AR SDK recognizes notable features in the frame, tracks differences in the positions of those features across video frames, and compares that information with motion sensing data of the user computing device 110 to determine a high-precision model of the user computing device's 110 position and motion. For example, the AR SDK combines motion sensor data with data generated from applying computer vision on the camera frames to gather information about the scene. This combined technology is called Visual Inertial Odometry. For example, a computer vision process works by identifying interesting regions from the images called features and then extracting these features from other images of the same environment. The way our two eyes allow us to perceive depth due to the parallax between them, AR SDK also requires the camera position between the captured frames to change in such a way that a parallax exists between them. Also, because translation is required, and pure rotation will not work, parallax is necessary for depth calculation. Therefore, undesired camera movements result in a poor uncovering experience as well as poor generation of a 3D model 105.

From block 410, the method 400 proceeds to block 420.

In embodiments in which the modeling system 110 performs method 300 along with method 300 of FIG. 3, the method 400 begins at block 420. For example, when the modeling system 110 performed the method 300 prior to performing method 400, the modeling system already determined the next frame for the video feed 128 at block 310 and therefore it is unnecessary to perform block 410.

At block 420, the method 400 involves determining, by the CMTM subsystem 115 based on camera position and direction information, if an undesired camera movement type occurred at the frame. To determine whether an undesired camera movement type occurred at the frame, the CMTM subsystem 115 determines a first unit vector representing a position and direction of the camera component 122 at the previous frame and a second unit vector representing a position and direction of the camera component 122 at the current frame identified in block 310 (or identified in block 410, as applicable).

At block 430, the method 400 involves determining, by the CMTM subsystem 115, whether the determined camera movement type determined in block 420 for the frame is an undesired camera movement type. The CMTM subsystem 115 determines undesired camera movement occurred at the frame based on determining that the first unit vector and the second unit vector diverge in front of the camera component 122 and meet behind the camera component 122. Otherwise, if the first unit vector and the second unit vectors converge in front of the camera component 122 or remain almost parallel, then the CMTM subsystem 115 determines that undesired camera movement did not occur at the frame. Further details about determining whether undesired camera movement occurred are described in FIG. 6 and FIG. 7.

If the CMTM subsystem 115 determines that the camera movement type determined in block 420 for the frame is an undesired camera movement type, the method 400 proceeds to block 440. The CMTM subsystem 115 determines undesired camera movement occurred at the frame based on determining that the first unit vector and the second unit vector diverge in front of the camera component 122 and meet behind the camera component 122

At block 440, the method 400 comprises displaying, by the CMTM subsystem 115, a camera movement type alert and discarding the frame from the camera scan data 102. For example, the CMTM subsystem 115 displays, via the user interface 125 an alert to the user that the current camera movement is undesired. For example, the alert may read "for a more accurate scan, avoid tilting or panning the camera," or other such language to alert the user that the user computing device 110 camera movement is undesired. In some instances, the alert may display, via the user interface 125, instructions described desired camera movement types. In some instances, discarding the frame from the camera scan data 102 comprises not saving a 2D image 103 associated with the frame in the camera scan data 102. Accordingly, the no 2D image 103 is captured for the frame and the frame does not influence generation of the 3D model 105.

From block 440, the method 400 returns to block 310 of FIG. 3.

Returning to block 430, if the CMTM subsystem 115 determines that the camera movement type determined in block 420 for the frame is not an undesired camera movement type, the method 400 proceeds to block 810 of FIG. 8. For example, the CMTM subsystem 115 determines undesired camera movement did not occur at the frame based on determining that the first unit vector (corresponding to the previous frame) and the second unit vector (corresponding to the current frame) converge in front of the camera component 122 or remain almost parallel. Further details about determining whether undesired camera movement occurred are described in FIG. 6 and FIG. 7.

In some embodiments, where methods 300 and 800 of FIG. 4 and FIG. 8, respectively, are not performed, if the CMTM subsystem 115 determines that the camera movement type determined in block 420 for the frame is not an undesired camera movement type, the method 400 proceeds to block 450. Also, in some embodiments, where method 300 is performed along with method 400 but method 800 is not performed, if the CMTM subsystem 115 determines that the camera movement type determined in block 420 for the frame is not an undesired camera movement type, the method 400 proceeds to block 450.

At block 450, the method 400 involves capturing, by the CMTM 115, a high resolution frame of the frame identified at block 410. Capturing the high resolution frame involves capturing a live image that is of a higher resolution (and therefore, a higher quality) compared to the frames that are received from applying the AR SDK to the camera component video feed data. For example, the AR SDK determines frames for processing at a predetermined rate (e.g. 60 frames per second or other predetermined rate) and each frame includes an image and position tracking data. In some embodiments, the AR SDK provides one or more application programming interfaces (APIs) for requesting a frame outside of the predetermined rate that comprises a high-resolution captured image.

At block 460, the method 400 involves saving, by the OM subsystem 113 in the camera scan data 102, a 2D image 103 from the high resolution frame. Accordingly, in embodiments where the method 400 is performed alone without performing the methods 300 and 800, the CMTM subsystem 115 captures a new high resolution frame each time camera movement type is not determined to be undesirable and then saves a 2D image 103 from the high resolution frame in the camera scan data 102. After iteratively performing method 400, the OM subsystem 113 has generated camera scan data 102 comprising a set of 2D images 103.

FIG. 5 illustrates types 500 of camera movement including undesired camera movement types, according to certain embodiments described herein. For illustrative purposes, FIG. 5 is described with reference to certain examples depicted in the figures. Other implementations, however, are possible. During a scan 106 of a 3D object 101, the quality of the camera scan data 102 is improved by using desired camera movement types and the quality of the camera scan data 102 is worsened by using undesired camera movement types. Undesired camera movement types result in 2D images in the camera scan data 102 that introduce distortions into the 3D model 105. Camera movement types can be grouped into three categories: good camera movements, transition camera movements, and bad camera movements. To result in an accurate 3D model 105, the user should attempt to mostly conduct good camera movements. Transition camera movements make it possible to connect good camera movements, making it possible to capture the object from new perspectives and angles. Bad camera movements should be avoided completely as they can lead to a failed distorted 3D model 105 of the object 101 of the scan 106.

Examples of good camera movements include the truck 512 camera movement, the pedestal 511 camera movement, the arc 522 camera movement, and the boom 521 camera movement. In a truck 512 camera movement, as illustrated in FIG. 5, the camera is moved across the object 101 horizontally in a straight trajectory while keeping the camera direction perpendicular to the motion of the user. In a pedestal 511 camera movement, as illustrated in FIG. 5, the camera is moved vertically up the object 101 while keeping the camera direction and angle fixed. The pedestal 511 camera movement is useful for scanning lower and upper areas of the object 101. In an arc 522 camera movement, the camera is moved around the object 101 in a curved convex trajectory. The arc 522 camera movement is useful for scanning corners of objects or for scanning circular objects. In a boom 521 camera movement, the camera is moved vertically while changing a camera direction to get a top view of the object. The boom 521 camera movement is useful for scanning a top surface of objects.

Examples of transition camera movements include the push in 531 camera movement and the pull out 532 camera movement. As illustrated in FIG. 5, in a push in 531 camera movement, the camera is moved closer to the object 101 with the camera direction being parallel to the motion direction. The push in 531 camera movement is useful for capturing surface details of the object 101. In a pull out 532 camera movement, the camera is moved away from the object 101 while keeping the camera direction parallel to the motion direction. The pull out 532 camera movement is useful for capturing wider shots of the object 101.

Examples of bad (undesirable) camera movements include the tilt 501 camera movement and the pan 502 camera movement. As illustrated in FIG. 5, in a tilt 501 camera movement, the camera is turned vertically from a fixed position. In a pan 502 camera movement, the camera is turned horizontally from a fixed position. Bad camera movements should always be avoided during a scan 106 as such movements negatively impact the results of 3D model 105 due to lowering a quality of 2D images 103 underlying the 3D model 105 captured during frames of the video feed 128 during which bad camera movements occur.

FIG. 6 depicts a conceptual model of camera movement geometry for use in detecting undesired camera movement types of FIG. 5, according to certain embodiments described herein. For illustrative purposes, FIG. 6 is described with reference to certain examples depicted in the figures. Other implementations, however, are possible.

In certain embodiments, the CMTM subsystem 115 represents camera movements between a previous frame and a current frame by two lines $\vec{l}_1$ and $\vec{l}_2$, in 3D space, where $\vec{l}_1 = {}_{P} + t*\vec{d}_1$, where $\vec{l}_2 = \vec{P}_2 + u*\vec{d}_2$, where t and u represent scalar values, where $\vec{P}_1$ and $\vec{P}_2$ are positional vectors associated with the camera at the previous frame and current frame, respectively, and $\vec{d}_1$ and $\vec{d}_2$ are camera directional vectors associated with the camera at the previous frame and current frame, respectively. Further, the CMTM subsystem 115 computes endpoints $\vec{e}_1$ and $\vec{e}_2$ of a shortest distance between $\vec{l}_1$ and $\vec{l}_2$. If the endpoints are calculated such that either t or u is negative, then CMTM subsystem 115 determines that an undesired camera movement occurred between the previous frame and the current frame. If the endpoints are calculated such that both t and u are positive, then the CMTM subsystem 115 determines that desired camera movement occurred between the previous frame and the current frame.

In certain instances, the above-described method of using shortest distance endpoint computation to determine undesired camera movements can lead to false positives in case of motions where $\vec{l}_1$ and $\vec{l}_2$ are parallel. It is important not to determine, in such instances, that the camera movement is of an undesired type if the lines are almost parallel, and instead this movement should only be determined to be undesired camera movement in cases where the camera is panned or tilted by at least a threshold angle between the lines $\vec{l}_1$ and $\vec{l}_2$. For example, the threshold angle can be 10 degrees or other predefined angle. Accordingly, the CMTM 115 can, if the angle is less than the threshold angle, consider the camera movement type as desired camera movement (or not an undesired camera movement) and does not need to compute the shortest distance between $\vec{l}_1$ and $\vec{l}_2$. Applying this threshold angle determination reduces a number of false positives of determination of undesired camera movement and also reduces the computation time.

The illustration of FIG. 6 can be helpful for calculating the angle between $\vec{l}_1$ and $\vec{l}_2$. FIG. 6 depicts a first positional vector, $\vec{P}_1$, and first directional vector, $\vec{d}_1$ corresponding to a camera component 122 position and orientation at a previous frame of the video feed 128 and a second positional vector, $\vec{P}_2$, and a second directional vector, $\vec{d}_2$, corresponding to the camera component 122 position and orientation at a current frame of the video feed 128. As illustrated in FIG. 6, the CMTM subsystem 115 can represent vectors $\vec{P}_1+\vec{d}_1$ and $\vec{P}_2+\vec{d}_2$ indefinitely until it is evident where they converge. Endpoints $\vec{e}_1$ and $\vec{e}_2$ represent a shortest distance between $\vec{l}_1$ and $\vec{l}_2$ that the CMTM subsystem 115 is configured to compute. The line formed by $\vec{e}_1$ and $\vec{e}_2$ is perpendicular to both $\vec{l}_1$ and $\vec{l}_2$. Because $\vec{e}_1$ and $\vec{e}_2$ lie on $\vec{l}_1$ and $\vec{l}_2$, respectively, t can be determined as:

$$t = \frac{(\vec{r}\cdot\vec{d_2})(\vec{d_1}\cdot\vec{d_2}) - \vec{r}\cdot\vec{d_1}}{1-(\vec{d_1}\cdot\vec{d_2})(\vec{d_1}\cdot\vec{d_2})}, \tag{1}$$

where $\vec{r}=\vec{P}_1-\vec{P}_2$. Further, u can be determined as:

$$u = \vec{r}\cdot\vec{d_2} + t(\vec{d_1}\cdot\vec{d_2}) \tag{2}$$

If t and u are both positive then the CMTM subsystem 115 determines a good camera movement type between the previous frame and the current frame. Otherwise, if either of t and u is negative and is also greater than −0.5, then the CMTM subsystem 115 determines an undesired camera (e.g. a significant tilt or pan) movement type between the previous frame and the current frame.

The following is example code that the CMTM subsystem 115 can execute for determining the scalar values u and t and determining whether camera movement is undesired:

```
func execute(_ input: CameraMotionInput) -> Bool {
  let dotD1D2 = dot(input.direction1, input.direction2)
  let angle = acos(dotD1D2) * 180 / .pi
  if (angle < ScanConstants.minAngleThreshold) {
    return false
}
  let diff = input.position1 − input.position2
  let dotDiffD1 = dot(diff, input.direction1)
  let dotDiffD2 = dot(diff, input.direction2)
  let numeratorT = dotDiffD2 * dotDID2 − dotDiffD1
  let denominatorT = 1 − dotD1D2 * dotD1D2
  let t = numeratorT/denominatorT
  let u = dotDiffD2 + t * dotD1D2
  if ((t < 0 && t > ScanConstants.scalarValueThreshold) ||
  (u < 0 && u > ScanConstants.scalarValueThreshold)) {
    return true
  } else {
    return false
  }
}
```

Figure 7:
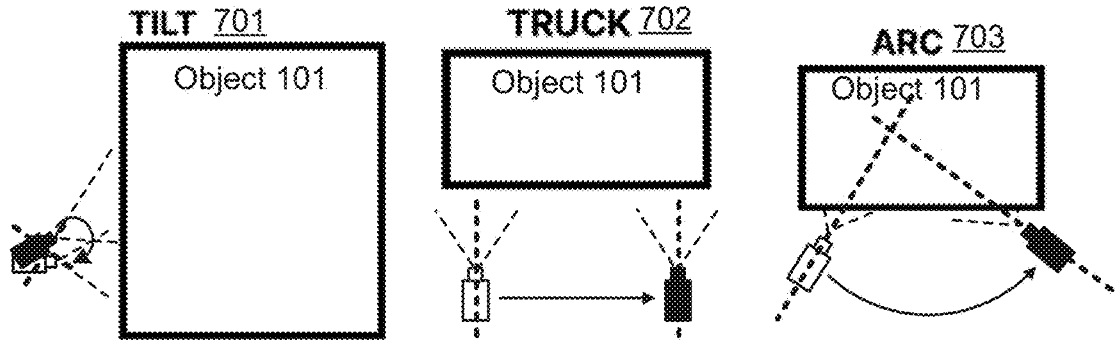
FIG. 7 illustrates a calculation of undesired and desired camera movement types, according to certain embodiments described herein.

FIG. 7 illustrates a calculation of undesired and desired camera movement types, according to certain embodiments described herein. For illustrative purposes, FIG. 7 is described with reference to certain examples depicted in the figures. Other implementations, however, are possible. FIG. 7 illustrates example tilt 701, truck 702, and arc 703 camera movements during a scan 106 of an object 101. FIG. 7 illustrates a camera position for each of these example camera movements at a position an orientation associated with a previous frame of the video feed 128 and at a position and orientation associated with a current frame of the video feed 128. FIG. 7 depicts vectors (shown in dashed lines) that represent these before and after camera orientations and positions. As shown in FIG. 7, the arc 703 camera movement is a desired camera movement because the vectors converge in front of the before and after camera positions. The tilt 701 camera movement is an undesired camera movement because the vectors converge behind the before and after camera positions. In the truck 702 camera movement type, the vectors remain almost parallel, and the CMTM subsystem 115 determines that undesired camera movement did not occur based on the methods for determining the camera movement type described in FIG. 6.

FIG. 8 depicts a method for generating, for display during a scan of an object, a model surface coverage preview indicating surface points of the object captured in the camera scan data in at least a threshold number of 2D images, according to certain embodiments described herein. One or more computing devices (e.g., the modeling system 110 or the individual subsystems contained therein) implement operations depicted in FIG. 8. For illustrative purposes, the method 800 is described with reference to certain examples depicted in the figures. Other implementations, however, are possible.

In embodiments where methods 300 and 400 of FIG. 3 and FIG. 4, respectively, are not performed, the method 800 begins at block 810.

At block 810, the method 800 involves determining, by the OCE subsystem 117, a next frame of the video feed 128. For example, the OM subsystem 113 executes an AR SDK to continuously capture video frames from the camera component 122 video feed 128 as well as determine the user computing device's 120 position and motion. The AR SDK recognizes notable features in the frame, tracks differences in the positions of those features across video frames, and compares that information with motion sensing data of the user computing device 110 to determine a high-precision model of the user computing device's 110 position and motion.

At block 820, the method 800 involves capturing a high resolution frame of the identified frame. Capturing the high resolution frame involves capturing a live image that is of a higher resolution (and therefore, a higher quality) compared to the frames that are received from applying the AR SDK to the camera component video feed data. For example, the AR SDK determines frames for processing at a predetermined rate (e.g. 60 frames per second or other predetermined rate) and each frame includes an image and position tracking data. In some embodiments, the AR SDK provides one or more application programming interfaces (APIs) for requesting a frame outside of the predetermined rate that comprises a high-resolution captured image.

From block 820, the method 800 proceed to block 830.

In embodiments in which the modeling system 110 performs method 800 along with one or more of the methods 300 and 400 of FIG. 3 and FIG. 4, the method 800 begins at block 830. For example, when the modeling system 110 performs one or both of the methods 300 and 400 along with performing method 800, the modeling system already determined the next frame for the video feed 128 at block 310 or at block 410 and therefore it is unnecessary to perform block 810.

Figures 9, 10:
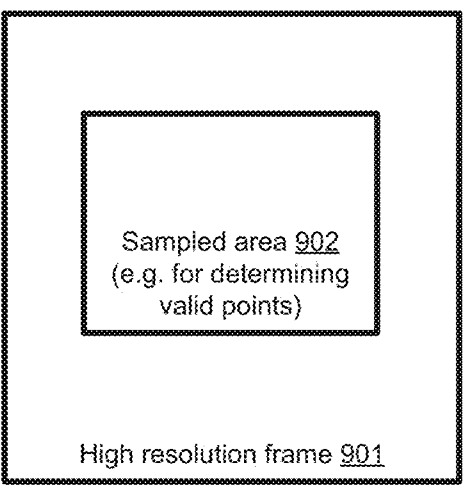
FIG. 9 illustrates a sampled area of a high resolution frame for use in determining valid points for determining object surface coverage, according to certain embodiments described herein.
FIG. 10. illustrates a user interface displaying an example model surface coverage preview generated according to the method of FIG. 8, according to certain embodiments described herein.

At block 830, the method 800 involves determining, by the OCE subsystem 117, valid points for a model surface coverage model 104 based on the high resolution frame. The OCE subsystem 117 samples, from the high resolution frame, a predefined number, M, of evenly distributed points in a center area on the frame. In some instances M is 4096 or other predefined number. For example, the center area is one fourth, one quarter, one half, or other proportion of the area of the frame in the center of the frame. FIG. 9 illustrates an example of a sampling area of a frame from which the M points are sampled. M is kept sufficiently high so that the sampled points densely cover the sampled image area of the frame. The sampling area of the frame is predefined to encourage the user to move the camera during the scan 106 to get full coverage of the object 101.

At block 840, the method 800 involves updating, by the OCE subsystem 117, a sliding window mechanism based on valid points determined at block 830. For example, the OCE subsystem 117 maintains a rotating sliding window at a length of M*N sample points for each of a predefined number N consecutive frames, where M is the number of sampled points per frame (sampled from the central sampling area) at block 840. An example of a rotating sliding window buffer size is 4096*4, where N is 4. For each of the sampled points, the OCE subsystem 117 determines color information (e.g. RGB color value), depth information, confidence information, and position information. The confidence information comprises a value that indicates a confidence of the AR SDK that the depth information is accurate for a particular point. In some instances, the confidence value can be value between 0, 1, and 2. The following is example code for sampling the frame:

```
struct ScanParticle {
    simd_float3 position;
    simd_float3 color;
    float confidence;
    simd_float3 normal;
};
```

In some instances, these values of the sampled points are determined using data determined via an AR SDK. For example, the OCE subsystem 117 retrieves a depth map and confidence map and un-projects the pixels of the depth map and the confidence map generated via the AR SDK to real world points, with the help of camera parameters. The following is an example of code for determining camera parameters:

```
private func update(
    frame : ARFr ame,
    orientation: UI InterfaceOrientation,
    viewportSize: CGSize ) -> (viewProjectionMatrix: matrix_float4x4,
        local ToWorld : matrix_float4x4,
        cameraIntrinsics lnversed: matrix_float3x3,
        cameraResolution : simd_float2,
        viewToCamera : matrix_float3x3,
        cameraDirection: simd_float3
    ) {
    // frame dependent info
    let camera = frame . camera
    let camera IntrinsicsInversed = camera. intrinsics . inverse
    let viewMatrix = camera. viewMat rix ( for : orientation)
    let viewMatrixlnversed = viewMatrix. inverse
    let projectionMatrix = camera. projectionMatrix ( for: orientation, viewpor tSize:
viewportSize, zNear: 0.001, zFar: 0)
    let viewProjectionMat rix = projectionMatrix * viewMatrix
    let localToWorld = viewMatrixinversed · Self . makeRotateToARCameraMatrix
(orientation : orientation)
    var viewtoCamera = matrix_float3x3( )
    viewtoCamera. copy( from : frame. displayTransform( for: orientation, viewportSize :
viewportSize). inverted( ))
    let cameraResolution = Float2(
        Float (frame. camera . imageResolution. width ) ,
        Float (frame . camera . imageResolution . height )
    )
    let cameraOirection = simd_make_float3(camera . transform . columns.2 · − 1 )
        return ( viewProj ectionMatrix, local ToWorld, cameraIntrinsicsInversed,
cameraResolution, viewtoCamera, cameraOirection)
}
```

When sampling the depth map, the OCE subsystem 117 can sample the depth map to obtain depth values, determine 3D positions based on the depth values, Sample Y and CbCr textures to get the YCbCr (Luma) color at the given texture coordinate, the confidence map to get the confidence value, and write the data to the buffer. The following is an example of annotated code for unprojecting a depth map to real world points:

```
vertex void scanUnprojectVertex( uint vertedO ((vertex.id)),
    constant ScanCoverageParameter &parameter
[[buffer(kScanCoverageParameterButIndex)]],
    device ScanParticle *particles [[buffer(kScanParticleBufindex)]],
    constant float2 *gridPoints [[buffer(kFrameSampleGridBufIndex)]],
    texture2d<float, access: : sample> capturedimageTextureY
[[texture(kCameraTextureY)]],
    texture2d<float, access:: sample> capturedimageTextureCbCr
[[texture(kCameraTextureCbCr)]],
    texture2d<float, access:: sample> depthTexture [[texture(kCamera TextureDepth]],
    texture2d<unsigned int , access:: sample> confidenceTexture
```

-continued

```
[[texture(kCameraTextureConfidence)]]) {
  const auto gridPoint = gridPoints[vertexID − parameter.startIndex];
  const auto currentPointIndex = vertexID;
  const auto texCoord = gridPoint / parameter.cameraResolution;
  // Sample the depth map to get the depth value
  const auto depth= depthtexture.sample(colorSampler, texCoord).r;
  // With a 20 point plus depth, we can now get its 3D position
  const auto position= worldPoint (gridPoint, depth, parameter.cameraintrinsicsinversed,
parameter. localToWorld);
  // Sample Y and CbCr textures to get the YCbCr color at the given texture coordinate
  con st auto ycbcr = float4(capturedlmageTextureY.sample(colorSampler, texCoord). r,
capturedImageTextureCbCr.sample(colorSampler, texCoord.xy). rg, 1);
  const auto sampledColor = ( yCbCrToRGB * ycbcr) .rgb;
  // Sample the confidence map to get the confidence value
  auto confidence = depth > parameter. depthlimit 7 0; confidenceTexture.
Sample(Colorsampler, TexCoord). r;
  const auto rightGridPt = gridPoint + float2(1.0, 0);
  const auto rightTexCoord = rightGridPt / parameter .cameraResolution;
  const auto rightDepth = depthTexture. sample(colorSampler , rightTexCoord). r;
  const auto rightPos = worldPoint(rightGridPt, rightDepth, parameter.cameraIntrinsics
Inversed , parameter.localToWorld);
  const auto topGridPt = gridPoint + float2(0, −1.0);
  const auto topTexCoord = topGridPt / parameter.cameraResolution;
  const auto topDepth = depthTexture.sample (colorSampler , topTexCoord). r;
  const auto topPos: worldPoint(topGridPt, topDepth, parameter.camenIntrinsicsInversed,
parameter.localToWorld);
  const auto rightDir = normalize(rightPos.xyz − position.xyz);
  const auto topDir = normalize(topPos.xyz − position.xyz);
  const auto normal = normalize(cross(rightDir, topDir));
  if (dot(parameter.cameraDirection, normal) > − 0.75) {
    confidence = 0 ;
  }
  // Write the data to the buffer
  particles[currentPointIndex].position = position.xyz;
  particles[currentPointIndex].color = sampledColor;
  particles[currentPointIndex].confidence = confidence;
  particles[currentPointIndex].normal = normal;
```

In some embodiments, the OCE subsystem 117 considers points as confident only when the surface normal and camera direction are almost in opposite directions. For example, almost in opposite directions can mean that the surface normal is in a direction a threshold angle from being in the opposite direction of the camera direction. In some instances, the depth limit can be predefined by the user. For example, prior to conducting the scan 106, the user can configure the depth limit so that it just encompasses the object, so that only the points that fall within the specified limit are considered for further calculation, which removes the background when providing live feedback of coverage in the model surface coverage preview 104. The OCE subsystem 117 considers the other N−1 set of Scanparticles (M in each set), collected over the last N−1 frames (N being the predefined number of consecutive frames), and project all these real world co-ordinates (x, y, z) onto the screen co-ordinates (u, v). If a particle does not project within screen bounds or has a different color than the color in the current frame at the projected location on the screen, then the OCE subsystem 117 determines that the point is either not visible in the frame or this point is a noisy one, and hence not suitable for further computation. Thus, the OCE subsystem 117 determines a confidence of any such particle as zero (0). This takes care of checking visibility across frames. The following is an example of code for filtering noise to keep valid points only:

```
vertex void scanProjectPointsForAccuracyCheckl uint vertex ID ( ( vertex_id]],
  constant ScanCoverageParameter &parameter
( (buffer( kScanCoverageParameterBufindex I]],
  device ScanParticle ·particles [ (buffer( kScanParticleBufindex)]],
  constant float2 ·gridPoints ( (buffer( kframeSampleGridBufindex)]],
  texture2d<float, access :: sample> capturedimageTextureY
( [ texture( kCameraTextureY)]),
  texture2d<float, access :: sample> capturedimageTextureCbCr
( ( texture( kCameraTextureCbCrl J) ,
  texture2d<float, access : : sample> depthTexture [ ( texture( kCamera TextureDepthl] J,
  texture2d<unsigned int , access : : sample> contidenceTexture
{ ( texture( kCameraTextureConfidence I]] I
if (vertexID >= uint (parameter . startindex ) && vertexID − parameter. start i ndex < uint
(parameter . singleframePointCount ))
  // This is computed just now, so these will map correctly
  return ;
}
const auto particleData = particles[vertexID];
if (particleOata . confidence < 2) {
  II not dealing with already low confidence particles
```

-continued

```
    return ;
}
// check against the current color, if they do not match, also discard
const auto particlePosition = particleData.position;
const auto particleColor = particleData. color;
const auto clipSpacePosition = parameter. viewProjectionMatrix * float4(par t iclePosition, 1 .
0 );
const auto normalizedOeviceCoordinate = clipSpacePosition / clipSpacePosition .w;
const auto projection= float2((normalizedDeviceCoordinate.x + 11 / 2 , (–
normalizedDeviceCoordinate.y + 1 ) / 21;
if (projection.x > 0 && projection.x < 1 && projection.y > 0 && projection .y < 1 &&
clipSpacePosition.z > 0 ) {
    const auto projectionCamera = float3(projection, 1 * parameter . viewToCamera;
    const float4 ycbcr = float4(capturedimageTextureY. sample (colorSampler,
projectionCamera. xy). r , capturedimageTextureCbCr. sample
(colorSampler ,projectionCamera.xy).rg, 11;
    const float3 imageColor = (yCbCrToRGB * ycbcrl .rgb;
        if (distance (particleCol or, imageColor) > 0.15 ( // TODO: we can check for
        distance as well with new distance to detenine if this is still visible
        particles(vertexIDJ. confidence · 0;
    }
} else {
    particles[vertexIO) . confidence · 0;
}
    }
```

Further, as part of updating the sliding window buffer, the OCE subsystem 117 promotes, to coverage data comprising final collection of scan points, points of the set of points in the sliding window buffer which have been present in all previous frames of the N-framed sliding buffer, and which have a confidence value greater than a threshold amount (e.g. greater than zero). In some instances, the confidence value is a value between 0, 1, and 2 and the OCE subsystem 117 discards any points having a confidence value less than 2. In some instances, the OCE subsystem 117 applies, in addition to determining whether to discard a point based on its confidence value, applies additional checks. The additional checks can include comparing the surface normal, camera direction, or color values, to further modify the confidence value and increase an accuracy of the confidence value. If any points do not pass these additional checks, the OCE subsystem 117 associates the respective confidence values of these points as zero values. After promoting any points meeting these criteria to the coverage data, as part of updating the sliding window buffer, the OCE subsystem 117 prepares the sliding window butter for a next video frame 128 by incrementing the sliding window buffer by M (the number of points in the sampling area) and rotates the (mod M*N) the StartIndex if required to point to the location for collecting new unprojected points (e.g. in the next frame, when method 800 is repeated for the next frame). The following is an example of code that can be executed for preparing the sliding window buffer for a next frame of the video feed 128:

```
commandBuffer. addCompletedHandler {_ in
    self . startIndex = (self . startIndex + Self .Single FramePointCount ) %
(Self .TotalPointCount )
    if (self . startIndex == 0 && !self .warmedUp ) {
        self .warmedUp = true
    }
    continuation. resume (returning :
        SlidingWindowResult (
            particleBuffer : self . particleBuffer ,
            resultIndex : (self . startindex + Self . SingleFramePointCount ) %
            resultCount: self .warmedUp ? Self . Si ngleFramePointCount : 0
```

-continued

```
        )
    )
}
```

At block 850, the method 800 involves updating, by the OCE subsystem 117, a model surface coverage preview 104 based on the updated sliding window mechanism of block 840 and based on a predefined consecutive instance threshold. The OCE subsystem 117 maintains a separate buffer for the coverage data (final collection of scan points). In some instances, the OCE subsystem 117 maintains a predefined number (e.g. 15 million) of points in the coverage data, with newest values replacing oldest values. For displaying the covered surface area of the object 101 in the model surface coverage preview 104, the OCE subsystem 113 first shades the full viewport (e.g. a camera view that is visible on the user interface) in stripes. The OCE subsystem 117 projects each 3D point in the coverage data onto a 2D screen space pixel. The OCE subsystem 117 conducts one or more checks. The one or more checks can, in some instances, include one or more of (1) determining that the point color and the current screen color are similar, (2) determining that the a distance from the camera to the point and a current depth at the projected position are similar, and (3) determining that the surface normal of the frame (precomputed for each pixel using a GPU kernel function using the depth and camera characteristics) is similar to the point normal. If all of the one or more checks are successful, then the OCE subsystem 117 determines that the pixel is oriented at the corresponding 3D point and is visible in its expected location and, therefore, the OCE subsystem 117 depicts the pixel as covered in the surface model coverage preview 104. However, if one or more of the one or more checks fails, then the OCE subsystem 117 does not depict the pixel as covered in the surface model coverage preview 104.

At block 860, the method 800 involves displaying, by the OCE subsystem 117, the model surface coverage preview 104 of block 850 on a user interface 125 of the user computing device 120. In some instances, the OCE subsystem 117 displays, via the user interface 125, the surface model coverage preview 104 as an overlay over a camera component 122 field of view already displayed on the user interface 125. For example, the OCE subsystem 117 displays two views as overlayed, the two views comprising a back plate and a front plate. In this example, the back plate renders the camera image and the front plate renders the covered/uncovered pixels determined in block 850. In this example, for back plate pixels looking at covered 3D points, the OCE subsystem 117 renders the corresponding front plate pixel as transparent, making the covered surface areas of the object 101 appear clear/transparent. In this example, for other pixels on the front plate, the OCE subsystem 117 maintains a shading with stripes so that so that uncovered areas appear shaded with stripes when seen through the front plate.

The following is example code for shading the front plate:

```
vertex ParticleVertexOut scanParticleVertex ( uint vertexID [ [ vertex_id)],
        constant ScanCoverageParameter &par ameter ( [buffer
  (kScanCoverageParameterBufIndex)] J,
        constant ScanParticle ·particles ( ( buffer ( kScanParticleBufIndex)) 1,
        texture2d<float , access : : sample> capturedImageTextureY [[texture
  (kCameraTextureY)]],
        texture2d<float, access : : sample> capturedImageTextureCbCr [[texture
  (kCameraTextureCbCr)]],
        texture2d<float , access : : sample> depthTexture ( [texture
  ( kCameraTextureDepth)]],
        texture2d<unsigned int, access : : sample> confidenceTexture ( ( texture
  (kCameraTextureConfidence)]],
        constant float3 = normalEstimates ( ( buffer ( kScanNormalBufindex)))) {
  const auto particleData = particles(vertexID);
  // check against the current depth, if they do not match, also discard
  const auto particlePosition = particleData.position;
  const auto particleColor = particleData. color;
  const auto particleNormal = particleData.normal;
  const auto clipSpacePosition = parameter. viewProjectionMatrix * float4( particlePosition,
1.0);
  const float point Size = max ( PARTICLE_SIZE / max (1 . 0, clipSpacePosition. Z), 2.0);
  const auto normalizedDeviceCoordinate = clipSpacePosition / clipSpacePosition.w;
  const auto projection= float2((normalizedDeviceCoordinate . x + 1 ) / 2, (−
normalizedOeviceCoordinate.y + 1 ) / 2 );
  auto visibility = particleData. confidence >= 2 ? 1 : 0 ;
  if (visibility && projection . x > 0 && projection.x < 1 && projection.y > 0 && projection.y
< 1 && clipSpacePosition.z > 0) {
    const auto projectionCamera = float3(projection, 1 ) * parameter. viewToCamera;
    const float4 ycbcr = float4 ( capturedimageTextureY. sample ( colorSampler,
projectionCamera. xy 1 . r 1capturedimageTextureCbCr. sample ( colorSampler,
projectionCamera. xy) . rg, 1 ) ;
    const float3 imageColor = ( yCbCrToRGB * ycbcr). rgb;
    if (di stance ( imageColor, particleColor) > 0 . 3) {
      visibility = 0 ;
    } else {
      con st auto confidence = confidenceTexture. sample (colorSampler, projectionCamera.
  xy) . r;
      if ( confidence >= 2 ) {
        const auto depth= depthTexture. sample (colorSampler, projectionCamera.xy).r;
        if ( abs ( depth − clipSpacePosi tion . z) > DEPTH_DISCARD_THRESHOLD) {
          visibility = 0;
          } else {
            const auto gridPointlookUp = uint2 ( projectionCamera. xy * float2
( depthTexture . get_width ( ) 1 depthTexture. get_height ( ) ) )
            const auto normal = normalEstimates[toNormallookup(gridPointlookUp,
depthTexture. get_width( ))];
            if (dot (particleNormal, normal) < 0.25) {
              visibility = 0;
            }
          }
      }
  } else {
    visibility = 0;
  }
  // prepare for output
  Particle VertexOut out;
  out. position = normalizedDeviceCoordinate;
  out. pointSize = pointSize;
  out. color = float4(particleColor, visibility);
  return out;
}
fragment float4 scanParticleFr agment ( ParticleVertexOut in [ [ stage_in] J,
        con st float2 coords [ [ point_coord]]) { / /Two-dimensional coordinates, which range
  from 0 . 0 to 1. 0 across a point primitive , specifying the location of the current fragment
  within the point primitive
  if (in.color.a == 0) {
    discard_fragment( );
  }
  // make succesfullly covered area transparent for backplate image to be visible through
transparency
```

-continued

```
    Return float 4(0.0, 0.0, 0.0, 0.0);
}
```

At block 870, the method 800 involves saving, in the camera scan data 102, a 2D image 103 from the high resolution frame. For example, the OCE subsystem 117 saves the 2D image 103 from the high resolution frame in the data storage unit 111. The saved 2D image becomes part of the camera scan data 102 used to construct a 3D model 105 of the object 101.

In embodiments where the method 800 is performed along with the methods 300 and 400, from block 870 the method 800 returns to block 310 of FIG. 3. In embodiments, where the method 800 is performed along with method 300 (and method 400 is not performed), from block 870 the method 800 returns to block 310 of FIG. 3. In embodiments where the method 800 is performed along with method 400 (and method 300 is not performed), from block 870 the method 800 returns to block 410 of FIG. 4. In embodiments where methods 300 and 400 are not performed along with method 800, from block 870 the method 800 returns to block 810.

FIG. 9 illustrates a sampled area 902 of a high resolution frame 901 for use in determining valid points for determining object surface coverage, according to certain embodiments described herein. M points are sampled from within the sampled area 902. M is kept sufficiently high so that the sampled points densely cover the sampled image area of the frame. The sampled area 902 of the high resolution frame 901 is predefined to encourage the user to move the camera during the scan 106 to get full coverage of the object 101. Further, use of the sampled area 902 reduces an amount of graphics processing unit (GPU) processing needed to maintain the sliding window buffer mechanism, ensuring a smoother experience at any particular frame rate (e.g. 60 FPS). Points near a margin of the frame (e.g. outside of the sampled area 902) may not be present in the consecutive subsequent frame (or within a number of consecutive subsequent frames less than the predefined number N of consecutive frames) of the video feed 128 in any case, therefore the OCE subsystem 117 reduces a number of GPU cycles needed by ignoring points outside of the central sampled area 902.

FIG. 10. illustrates a user interface 1000 (e.g. user interface 125) displaying an example model surface coverage preview generated according to the method of FIG. 8, according to certain embodiments described herein. In the example of FIG. 10, the user interface 1000 displays a model surface coverage preview 1001 including a camera component 122 view of the environment of the user computing device 110 during a scan 106 of an object 101 that is overlaid with a non-covered region 1004. For example, the non-covered region 1004 overlay shows portions of the object 101 (the rabbit object) and background that do not have sampled points for a set of N frames. The covered region 1003 displays as the camera view of the camera component 122 with no overlay. Upon viewing the non-covered region 1004 overlay, the user knows to orient the camera component 122 to attempt to obtain camera scan data 102 that is sufficient to update the model surface coverage preview 1001 such that the portions of the non-covered region 1004 are able to display as part of the covered region 1003. Further details about determining the covered region 1003 and non-covered region 1004 are described in FIG. 8.

Figures 11, 12:
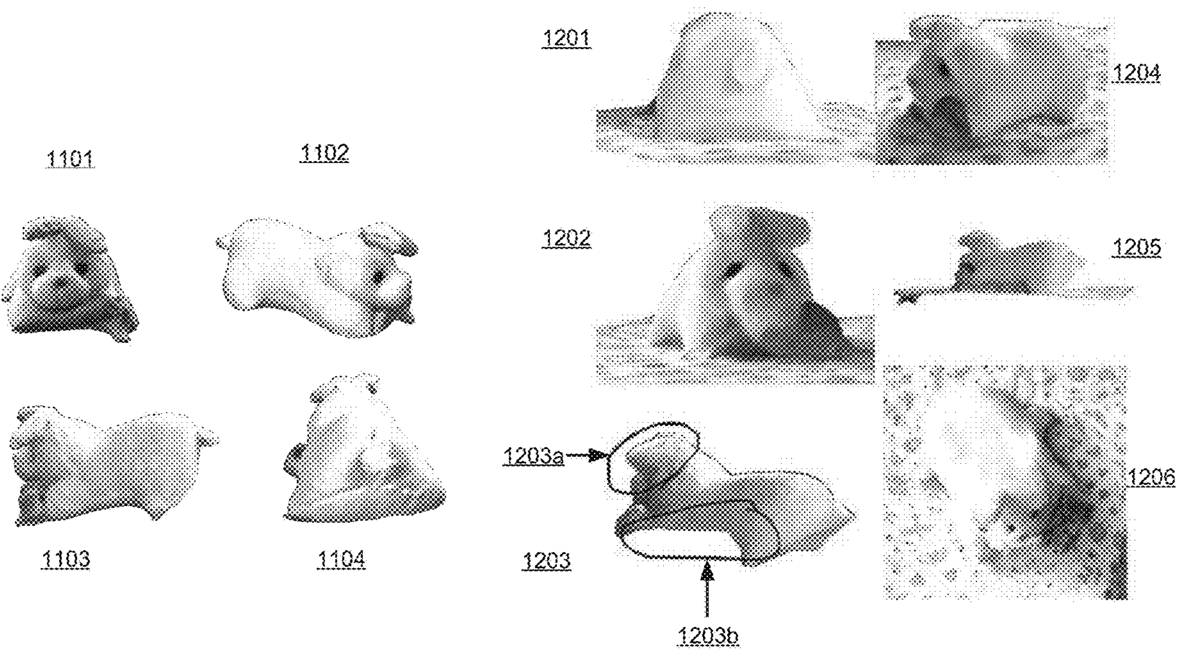
FIG. 11 illustrates four perspective views of an example 3D model generated according to the method of FIG. 2, according to certain embodiments described herein.
FIG. 12 illustrates example 3D models generated according to conventional modeling systems, according to certain embodiments described herein.

FIG. 11 illustrates four perspective views of an example 3D model 105 generated according to the method of FIG. 2, according to certain embodiments described herein. For example, FIG. 11 illustrates a front view 1101, a right side view 1102, a left side view 1003, and a rear view 1104 of a 3D model 105 of the rabbit object 101 that is also depicted in the model surface coverage preview 1000 of FIG. 10.

FIG. 12 illustrates example 3D models 1201, 1202, 1203, 1204, 1205, and 1206 generated according to conventional modeling systems, according to certain embodiments described herein. The 3D models 1201, 1202, and 1204 are generated using a Scaniverse modeling system, which is a conventional modeling system. The 3D model 1205 is generated using a Polycam modeling system, which is a conventional modeling system. The 3D model 1206 is generated using 3D Scanner App, a conventional modeling system. The 3D model 1203 was generated using certain embodiments described herein, but without applying the methods 223, 225, 227 of FIG. 2 (and their more detailed explanations in FIG. 3, FIG. 4, and FIG. 8, respectively), for generating improved camera scan data 102. The 3D models 1201, 1202, 1203, 1204, 1205, and 1206 show various distortions and inaccuracies. For example, 3D model 1201 is missing pixels in a lower region of the rabbit object 101. 3D model 1204 inaccurately renders a portion of the carrot region of the rabbit object 101. The 3D model 1202, among other distortions, inaccurately renders the eyes and ears of the rabbit object 101. The 3D model 1205, among other distortions, inaccurately renders the hind legs and tail of the rabbit object 101. The 3D model 1206, among other distortions, inaccurately a midsection/back of the rabbit object 101. The 3D model 1203, among other distortions, inaccurately renders the ears (see region 1203*a*) and a crease of the rabbit object (see region 1203*b*). Accordingly, the 3D models 1201, 1202, 1203, 1204, 1205, and 1206 depicted in FIG. 12, which are not generated using improved camera scan data 102 generated according to the embodiments described herein, include distortions which do not appear in the 3D model depicted in FIG. 11, which is generated according to the embodiments described herein. In other words the various distortions of 3D models 1201, 1202, 1203, 1204, 1205, and 1206 are remedied in the 3D model depicted in FIG. 11, which is generated according to the embodiments described herein for generating improved camera scan data 102 which underlies the 3D model depicted in FIG. 11.

Examples of Computing Environments for Implementing Certain Embodiments

Figure 13:
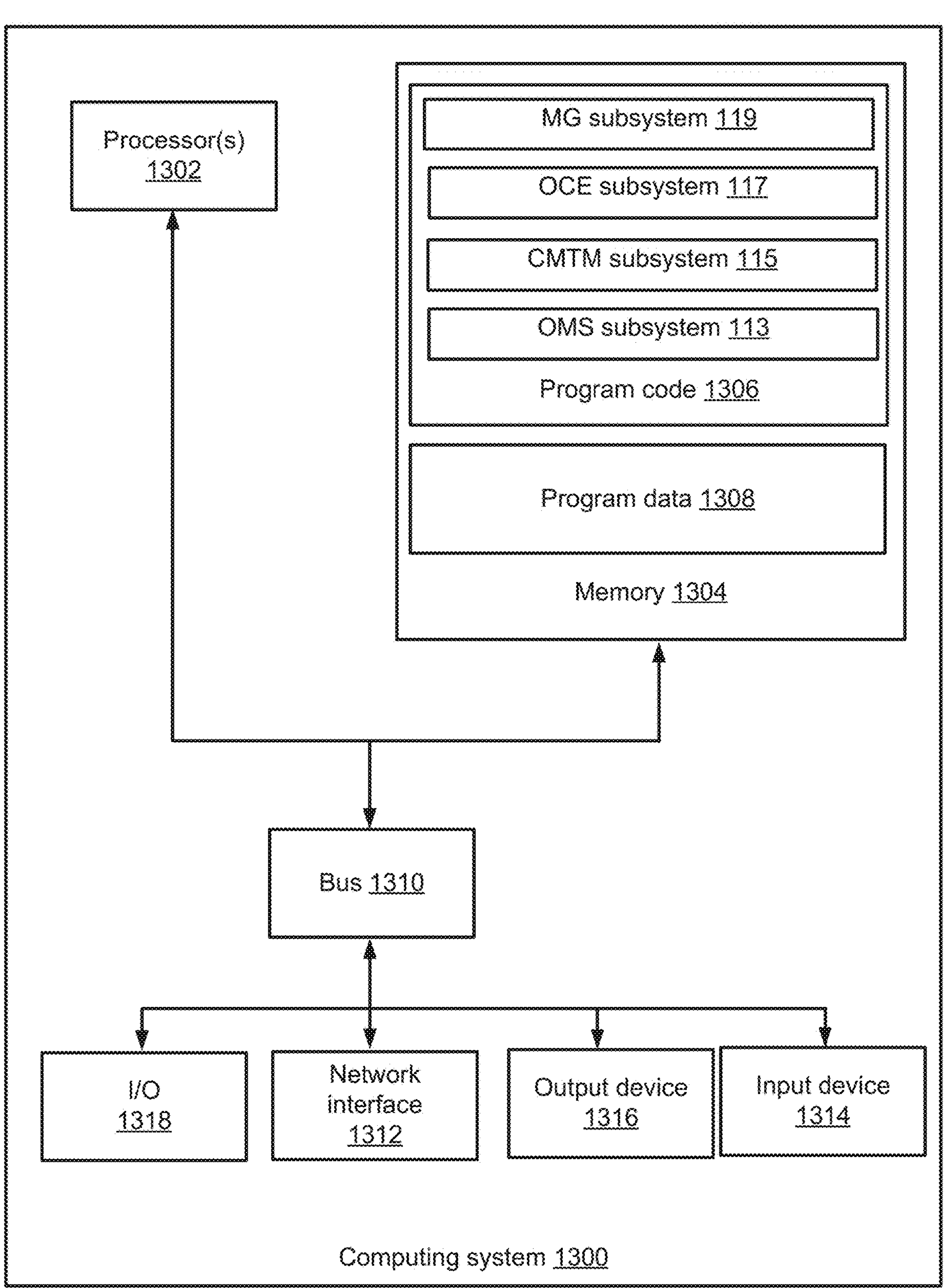
FIG. 13 depicts an example of a computing system that performs certain operations described herein, according to certain embodiments disclosed herein.

Any suitable computer system or group of computer systems can be used for performing the operations described herein. For example, FIG. 13 depicts an example of a computer system 1300. The depicted example of the computer system 1300 includes a processing device 1302 communicatively coupled to one or more memory components 1304. The processing device 1302 executes computer-executable program code stored in a memory component 1304, accesses information stored in the memory component 1304, or both. Execution of the computer-executable program code causes the processing device to perform the operations described herein. Examples of the processing device 1302 include a microprocessor, an application-specific integrated circuit ("ASIC"), a field-programmable gate array ("FPGA"), or any other suitable processing device. The processing device 1302 can include any number of processing devices, including a single processing device.

The memory components 1304 includes any suitable non-transitory computer-readable medium for storing program code 1306, program data 1308, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 1304 can be volatile memory, non-volatile memory, or a combination thereof.

The computer system 1300 executes program code 1306 that configures the processing device 1302 to perform one or more of the operations described herein. Examples of the program code 1306 include, in various embodiments, the modeling system 110 (including the OM subsystem 113, the CMTM subsystem 115, the OCE subsystem 117, and the MG subsystem 119) of FIG. 1, which may include any other suitable systems or subsystems that perform one or more operations described herein (e.g., one or more neural networks, encoders, attention propagation subsystem and segmentation subsystem). The program code 1306 may be resident in the memory components 1304 or any suitable computer-readable medium and may be executed by the processing device 1302 or any other suitable processor.

The processing device 1302 is an integrated circuit device that can execute the program code 1306. The program code 1306 can be for executing an operating system, an application system or subsystem, or both. When executed by the processing device 1302, the instructions cause the processing device 1302 to perform operations of the program code 1306. When being executed by the processing device 1302, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 1304 store the program data 1308 that includes one or more datasets described herein. In some embodiments, one or more of data sets are stored in the same memory component (e.g., one of the memory components 1304). In additional or alternative embodiments, one or more of the programs, data sets, models, and functions described herein are stored in different memory components 1304 accessible via a data network. One or more buses 1310 are also included in the computer system 1300. The buses 1310 communicatively couple one or more components of a respective one of the computer system 1300.

In some embodiments, the computer system 1300 also includes a network interface device 1312. The network interface device 1312 includes any device or group of devices suitable for establishing a wired or wireless data connection to one or more data networks. Non-limiting examples of the network interface device 1312 include an Ethernet network adapter, a modem, and/or the like. The computer system 1300 is able to communicate with one or more other computing devices via a data network using the network interface device 1312.

The computer system 1300 may also include a number of external or internal devices, an input device 1314, a presentation device 1316, or other input or output devices. For example, the computer system 1300 is shown with one or more input/output ("I/O") interfaces 1318. An I/O interface 1318 can receive input from input devices or provide output to output devices. An input device 1314 can include any device or group of devices suitable for receiving visual, auditory, or other suitable input that controls or affects the operations of the processing device 1302. Non-limiting examples of the input device 1314 include a touchscreen, a mouse, a keyboard, a microphone, a separate mobile computing device, etc. A presentation device 1316 can include any device or group of devices suitable for providing visual, auditory, or other suitable sensory output. Non-limiting examples of the presentation device 1316 include a touchscreen, a monitor, a speaker, a separate mobile computing device, etc.

Although FIG. 13 depicts the input device 1314 and the presentation device 1316 as being local to the computer system 1300, other implementations are possible. For instance, in some embodiments, one or more of the input device 1314 and the presentation device 1316 can include a remote client-computing device that communicates with computing system 1300 via the network interface device 1312 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 14:
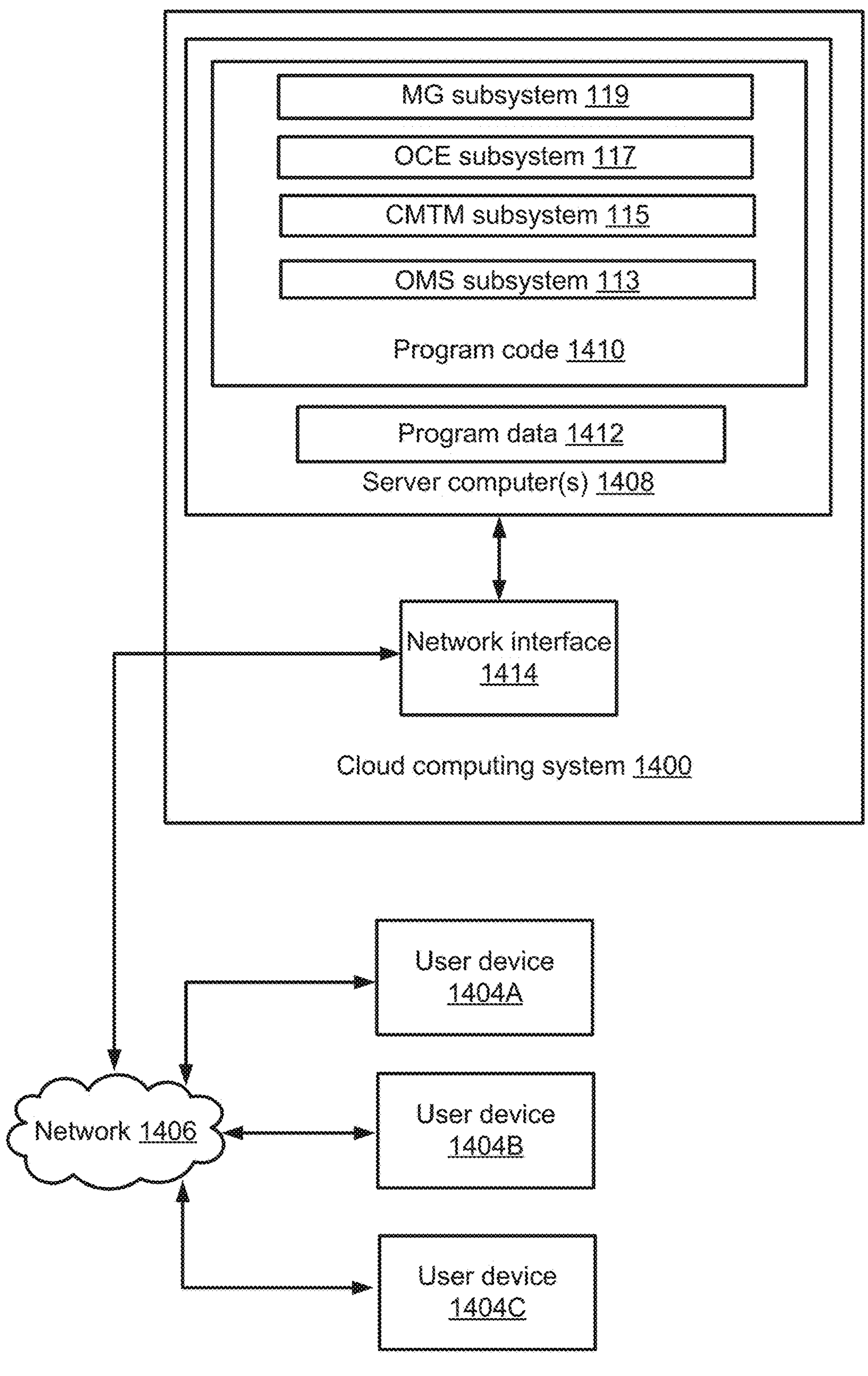
FIG. 14 depicts an example of a cloud computing system that performs certain operations described herein, according to certain embodiments disclosed herein.

In some embodiments, the functionality provided by computer system 1300 may be offered as cloud services by a cloud service provider. For example, FIG. 14 depicts an example of a cloud computer system 1400 offering a service for generating camera scan data 102 for creating a 3D model 105 of an object 101 during a user computing device 120 camera scan 106. The cloud computer system 1400 performs the processing to provide the service of generating camera scan data 102 for creating a 3D model 105 of an object 101 during a user computing device 120 camera scan 106.

The cloud computer system 1400 may include one or more remote server computers 1408. The remote server computers 1408 include any suitable non-transitory computer-readable medium for storing program code 1410 (e.g., the subsystems 113, 115, 117, and 119 of FIG. 1) and program data 1412, or both, which is used by the cloud computer system 1400 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1408 can include volatile memory, non-volatile memory, or a combination thereof.

One or more of the server computers 1408 execute the program code 1410 that configures one or more processing devices of the server computers 1408 to perform one or more of the operations that generate camera scan data 102 for creating a 3D model 105 of an object 101 during a user computing device 120 camera scan 106. As depicted in the embodiment in FIG. 14, the one or more servers providing the service for generating camera scan data 102 for creating a 3D model 105 of an object 101 during a user computing device 120 camera scan 106. Any other suitable systems or subsystems that perform one or more operations described herein (e.g., one or more development systems for configuring an interactive user interface) can also be implemented by the cloud computer system 1400.

In certain embodiments, the cloud computer system 1400 may implement the services by executing program code and/or using program data 1412, which may be resident in a memory component of the server computers 1408 or any suitable computer-readable medium and may be executed by the processing devices of the server computers 1408 or any other suitable processing device.

In some embodiments, the program data 1412 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 1406.

The cloud computer system 1400 also includes a network interface device 1414 that enable communications to and from cloud computer system 1400. In certain embodiments, the network interface device 1414 includes any device or group of devices suitable for establishing a wired or wireless data connection to the data networks 1406. Non-limiting examples of the network interface device 1414 include an Ethernet network adapter, a modem, and/or the like. The service for generating camera scan data 102 for creating a 3D model 105 of an object 101 during a user computing device 120 camera scan 106 is able to communicate with the user devices 1404A, 1404B, and 1404C via the data network 1406 using the network interface device 1414.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing devices associated with a modeling system, comprising:
- accessing, during a camera scan of a three-dimensional (3D) physical object, video feed data of a user computing device comprising a plurality of frames; and
- generating camera scan data from the video feed data, the camera scan data comprising a set of two-dimensional (2D) images of the physical object generated from a subset of the plurality of frames of the video feed data, wherein generating the camera scan data comprises:
  - identifying a current frame and a previous frame to the current frame in the video feed data;
  - determining a rotation or a translation between the previous frame and the current frame;
  - responsive to determining that the rotation is greater than a threshold rotation or responsive to determining that the translation is greater than a threshold translation, including the current frame in the camera scan data; and
- constructing, from the camera scan data for display via a user interface of the user computing device, a 3D virtual model of the physical object.

2. The method of claim 1, wherein including the current frame in the camera scan data includes:
- generating a high resolution frame from the current frame; and
- generating a 2D image from the high resolution frame, wherein the 2D image is included in the set of 2D images.

3. The method of claim 1, wherein generating the camera scan data further comprises:
- responsive to determining that the rotation is less than or equal to the threshold rotation or responsive to determining that the translation is less than or equal to the threshold translation, excluding the current frame from the camera scan data.

4. The method of claim 1, wherein generating the camera scan data further comprises:
- determining a velocity of the user computing device at a time of the current frame;
- wherein including the current frame from the camera scan data is further based on determining that the velocity of the user computing device is less than a threshold velocity.

5. The method of claim 4, wherein generating the camera scan data further comprises:
- responsive to determining that the velocity is greater than or equal to the threshold velocity, excluding the current frame from the camera scan data.

6. The method of claim 5, wherein generating the camera scan data further comprises:
- displaying, via the user interface, an alert responsive to determining that the velocity is greater than or equal to the threshold velocity.

7. The method of claim 1, wherein generating the camera scan data further comprises:
- determining a change in camera position and a change in camera direction between the previous frame and the current frame; and
- determining a camera movement type at a time associated with the current frame based on the change in camera position and the change in camera direction,
- wherein including the current frame in the camera scan data is further based on determining that the camera movement type corresponds to one of a set of predefined categories.

8. The method of claim 7, further comprising:
- determining a first vector representing a previous camera position and a previous camera direction associated with the previous frame;
- determining a second vector representing a current camera position and a current camera direction associated with the current frame; and
- determining that the camera movement type at the time associated with the current frame corresponds to an undesired camera movement type when the first vector intersects the second vector at a location behind a camera location.

9. The method of claim 1, wherein generating the camera scan data further comprises:
- sampling a set of points from the current frame;
- generating a model surface coverage preview for display on the user interface, wherein the model surface coverage preview represents a surface of the physical object; and
- indicating, in the model surface coverage preview, a subset of the set of points which are sampled in a set of N consecutive frames of the video feed data, wherein the current frame is a last frame of the set of N consecutive frames.

10. A system comprising:

a memory component; and a processing device coupled to the memory component, the processing device configured to perform operations comprising:

accessing, during a camera scan of a three-dimensional (3D) physical object, video feed data of a user computing device comprising a plurality of frames; and generating camera scan data from the video feed data, the camera scan data comprising a set of two-dimensional (2D) images of the physical object generated from a subset of the plurality of frames of the video feed data, wherein generating the camera scan data comprises:

identifying a current frame and a previous frame to the current frame in the video feed data;

determining a camera movement type at a time associated with the current frame, wherein the camera movement type comprises either a desired camera movement type or an undesired camera movement type; and responsive to determining that the camera movement type corresponds to an undesired camera movement type, excluding a 2D image associated with the current frame from the set of 2D images of the camera scan data; and constructing, from the camera scan data for display via a user interface of the user computing device, a 3D virtual model of the physical object.

11. The system of claim 10, wherein determining the camera movement type comprises:

determining a first vector representing a previous camera position and a previous camera direction associated with the previous frame;

determining a second vector representing a current camera position and a current camera direction associated with the current frame; and determining that the camera movement type at the time associated with the current frame corresponds to the undesired camera movement type when the first vector intersects the second vector at a location behind a camera location.

12. The system of claim 10, the operations further comprising, responsive to determining that the camera movement type corresponds to the undesired camera movement type, displaying, via the user interface, an alert.

13. The system of claim 10, wherein generating the camera scan data further comprises:

determining a rotation or a translation between the previous frame and the current frame, wherein the 2D image associated with the current frame is excluded from the camera scan data further based on determining that the rotation is less than a threshold rotation or that the translation is less than a threshold translation.

14. The system of claim 10, wherein generating the camera scan data further comprises:

determining a velocity of the user computing device at a time of the current frame;

wherein excluding the 2D image associated with the current frame from the camera scan data is further based on determining that the velocity is greater than a threshold velocity.

15. The system of claim 10, wherein generating the camera scan data further comprises:

sampling a set of points from the current frame;

generating a model surface coverage preview for display on the user interface, wherein the model surface coverage preview represents a surface of the physical object; and indicating, in the model surface coverage preview, a subset of the set of points which are sampled in a set of N consecutive frames of the video feed data, wherein the current frame is a last frame of the set of N consecutive frames.

16. A non-transitory computer-readable medium storing executable instructions, which when executed by a processing device, cause the processing device to perform operations comprising:

accessing, during a camera scan of a three-dimensional (3D) physical object, video feed data of a user computing device comprising a plurality of frames; and generating camera scan data from the video feed data, the camera scan data comprising a set of two-dimensional (2D) images of the physical object generated from a subset of the plurality of frames of the video feed data, wherein generating the camera scan data comprises:

identifying a current frame in the video feed data;

sampling a set of points from a sampling region of the current frame; and identifying a subset of the set of points which are sampled in the current frame and that also sampled in a group of frames comprising a predefined number of consecutive frames ending with the current frame; and generating, for display via a user interface of the user computing device, a model surface coverage preview indicating the subset of the set of points.

17. The non-transitory computer-readable medium of claim 16, the operations further comprising:

determining a first vector representing a previous camera position and a previous camera direction associated with a previous frame;

determining a second vector representing a current camera position and a current camera direction associated with the current frame; and determining that a camera movement type at a time associated with the current frame corresponds to an undesired camera movement type when the first vector intersects the second vector at a location behind a camera location.

18. The non-transitory computer-readable medium of claim 17, wherein identifying the subset of the set of points further comprises:

accessing a sliding window buffer associated with the predefined number of consecutive frames, wherein the sliding window buffer defines, for each of the group of frames, a set of points sampled from the respective frame;

adding, to the sliding window buffer, the sampled set of points sampled from the current frame; and identifying the subset of the set of points, wherein the subset of the set of points appears in each frame of the group of frames.

19. The non-transitory computer-readable medium of claim 17, wherein generating the model surface coverage preview comprises:

generating, for display in a camera view of the user interface, an overlay which indicates all regions of the camera view that does not correspond to the identified subset of the set of points.

20. The non-transitory computer-readable medium of claim 17, the operations further comprising:

constructing, from the camera scan data for display via a user interface of the user computing device, a 3D virtual model of the physical object.

* * * * *